(12) United States Patent
Kale et al.

(10) Patent No.: US 12,272,130 B2
(45) Date of Patent: *Apr. 8, 2025

(54) INTELLIGENT ONLINE PERSONAL ASSISTANT WITH OFFLINE VISUAL SEARCH DATABASE

(71) Applicant: eBay Inc., San Jose, CA (US)

(72) Inventors: Ajinkya Gorakhnath Kale, San Jose, CA (US); Fan Yang, San Jose, CA (US); Qiaosong Wang, San Francisco, CA (US); Mohammadhadi Kiapour, San Francisco, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/457,212

(22) Filed: Aug. 28, 2023

(65) Prior Publication Data

US 2023/0401839 A1    Dec. 14, 2023

Related U.S. Application Data

(63) Continuation of application No. 17/512,389, filed on Oct. 27, 2021, now Pat. No. 11,804,035, which is a
(Continued)

(51) Int. Cl.
*G06F 16/583* (2019.01)
*G06F 16/2457* (2019.01)
(Continued)

(52) U.S. Cl.
CPC ........ *G06V 10/82* (2022.01); *G06F 16/24578* (2019.01); *G06F 16/248* (2019.01);
(Continued)

(58) Field of Classification Search
None
See application file for complete search history.

(56) References Cited

U.S. PATENT DOCUMENTS 5,579,471 A    11/1996  Barber et al.
6,363,378 B1    3/2002  Conklin et al.
(Continued)

FOREIGN PATENT DOCUMENTS

AU    2005202353    6/2005
CN    1823334    8/2006
(Continued)

OTHER PUBLICATIONS

US 11,487,810 B2, 11/2022, Kale et al. (withdrawn)
(Continued)

*Primary Examiner* — Giuseppi Giuliani
(74) *Attorney, Agent, or Firm* — FIG. 1 Patents

(57) ABSTRACT

Systems, methods, and computer program products for identifying a candidate product in an electronic marketplace based on a visual comparison between candidate product image visual content and input query image visual content. Embodiments generate and store descriptive image signatures from candidate product images or selected portions of such images. A subsequently calculated visual similarity measure serves as a visual search result score for the candidate product in comparison to an input query image. Any number of images of any number of candidate products may be analyzed, such as for items available for sale in an online marketplace. Image analysis results are stored in a database and made available for subsequent automated on-demand visual comparisons to an input query image. The embodiments enable substantially real time visual based product searching of a potentially vast catalog of items.

20 Claims, 14 Drawing Sheets

Related U.S. Application Data continuation of application No. 15/294,767, filed on Oct. 16, 2016, now Pat. No. 11,748,978.

(51) Int. Cl.
| | |
|---|---|
| *G06F 16/248* | (2019.01) |
| *G06F 16/334* | (2025.01) |
| *G06F 16/51* | (2019.01) |
| *G06F 18/2411* | (2023.01) |
| *G06Q 30/0601* | (2023.01) |
| *G06V 10/75* | (2022.01) |
| *G06V 10/82* | (2022.01) |
| *G06N 3/044* | (2023.01) |
| *G06N 7/01* | (2023.01) |

(52) U.S. Cl.
CPC .......... *G06F 16/3344* (2019.01); *G06F 16/51* (2019.01); *G06F 16/5838* (2019.01); *G06F 18/2411* (2023.01); *G06Q 30/0643* (2013.01); *G06V 10/758* (2022.01); *G06N 3/044* (2023.01); *G06N 7/01* (2023.01)

(56) References Cited

U.S. PATENT DOCUMENTS

| | | |
|---|---|---|
| 6,609,005 B1 | 8/2003 | Chern |
| 6,609,605 B1 | 8/2003 | Linder |
| 6,901,378 B1 | 5/2005 | Linker et al. |
| 7,428,516 B2 | 9/2008 | Pittman et al. |
| 7,496,514 B2 | 2/2009 | Ross et al. |
| 8,346,563 B1 | 1/2013 | Hjelm et al. |
| 8,386,495 B1 | 2/2013 | Sandler et al. |
| 8,429,173 B1 | 4/2013 | Rosenberg et al. |
| 8,447,823 B2 | 5/2013 | Zhang |
| 8,577,671 B1 | 11/2013 | Barve et al. |
| 8,670,979 B2 | 3/2014 | Gruber |
| 8,732,030 B2 | 5/2014 | Gokturk et al. |
| 8,761,512 B1 | 6/2014 | Buddemeier |
| 8,775,424 B2 | 7/2014 | Skaff et al. |
| 8,838,606 B1 | 9/2014 | Cormack et al. |
| 8,903,198 B2 | 12/2014 | Datta et al. |
| 9,025,811 B1 | 5/2015 | Ioffe et al. |
| 9,104,100 B2 | 8/2015 | Redinger et al. |
| 9,104,700 B1 | 8/2015 | Ramkumar et al. |
| 9,153,231 B1 | 10/2015 | Salvador et al. |
| 9,189,742 B2 | 11/2015 | London |
| 9,195,898 B2 | 11/2015 | Huang et al. |
| 9,390,315 B1 | 7/2016 | Yalniz et al. |
| 9,411,830 B2 | 8/2016 | Mei et al. |
| 9,424,494 B1 | 8/2016 | Lineback et al. |
| 9,569,700 B1 | 2/2017 | Santos et al. |
| 9,734,460 B1 | 8/2017 | Venkataraman et al. |
| 9,830,631 B1 | 11/2017 | Dhua et al. |
| 10,157,333 B1 | 12/2018 | Wang et al. |
| 10,387,866 B1 | 8/2019 | Yachin et al. |
| 10,417,346 B2 | 9/2019 | Kim et al. |
| 10,503,775 B1 | 12/2019 | Ranzinger et al. |
| 10,762,548 B1 | 9/2020 | Krishnan et al. |
| 10,860,898 B2 | 12/2020 | Yang et al. |
| 10,970,768 B2 | 4/2021 | Zheng et al. |
| 11,004,131 B2 | 5/2021 | Kale et al. |
| 11,604,951 B2 | 3/2023 | Yang et al. |
| 11,748,978 B2 | 9/2023 | Kale et al. |
| 11,804,035 B2 | 10/2023 | Kale et al. |
| 11,836,777 B2 | 12/2023 | Kale et al. |
| 12,020,174 B2 | 6/2024 | Gaskill et al. |
| 2001/0049688 A1 | 12/2001 | Fratkina et al. |
| 2002/0038299 A1 | 3/2002 | Zernik et al. |
| 2003/0063779 A1 | 4/2003 | Wrigley |
| 2003/0212520 A1 | 11/2003 | Campos et al. |
| 2003/0217052 A1 | 11/2003 | Rubenczyk et al. |
| 2005/0225678 A1 | 10/2005 | Zisserman et al. |
| 2006/0074771 A1 | 4/2006 | Kim |
| 2006/0253491 A1 | 11/2006 | Gokturk |
| 2007/0136140 A1 | 6/2007 | Smith |
| 2007/0156520 A1 | 7/2007 | Sharma |
| 2008/0037877 A1 | 2/2008 | Jia et al. |
| 2008/0082426 A1 | 4/2008 | Gokturk et al. |
| 2008/0097859 A1 | 4/2008 | Schrenk |
| 2008/0199075 A1 | 8/2008 | Gokturk et al. |
| 2008/0212899 A1 | 9/2008 | Gokturk et al. |
| 2009/0177758 A1 | 7/2009 | Banger et al. |
| 2009/0193123 A1 | 7/2009 | Mitzlaff |
| 2009/0216755 A1 | 8/2009 | Itamar |
| 2009/0234712 A1 | 9/2009 | Kolawa et al. |
| 2009/0287678 A1 | 11/2009 | Brown et al. |
| 2009/0313088 A1 | 12/2009 | Ali et al. |
| 2010/0198592 A1 | 8/2010 | Potter |
| 2010/0223275 A1 | 9/2010 | Foulger et al. |
| 2010/0293174 A1 | 11/2010 | Bennett et al. |
| 2011/0019925 A1 | 1/2011 | Luk |
| 2011/0029561 A1 | 2/2011 | Slaney et al. |
| 2011/0085697 A1 | 4/2011 | Clippard et al. |
| 2011/0088053 A1 | 7/2011 | Gruber et al. |
| 2011/0191250 A1 | 8/2011 | Bishop et al. |
| 2011/0191336 A1 | 8/2011 | Wang et al. |
| 2011/0196859 A1 | 8/2011 | Mei et al. |
| 2011/0235902 A1 | 9/2011 | Chittar et al. |
| 2011/0243459 A1 | 10/2011 | Deng |
| 2011/0246330 A1 | 10/2011 | Tikku et al. |
| 2011/0286628 A1 | 11/2011 | Goncalves et al. |
| 2011/0314031 A1 | 12/2011 | Chittar et al. |
| 2012/0016678 A1 | 1/2012 | Gruber et al. |
| 2012/0030227 A1 | 2/2012 | Mital et al. |
| 2012/0078825 A1 | 3/2012 | Kulkarni et al. |
| 2012/0084135 A1 | 4/2012 | Nissan et al. |
| 2012/0128239 A1 | 5/2012 | Goswami et al. |
| 2012/0154633 A1 | 6/2012 | Rodriguez |
| 2012/0177294 A1 | 7/2012 | Ke et al. |
| 2012/0209751 A1 | 8/2012 | Chen |
| 2012/0215770 A1 | 8/2012 | Isaacson et al. |
| 2012/0232987 A1 | 9/2012 | Everingham |
| 2012/0283574 A1 | 11/2012 | Park et al. |
| 2012/0303615 A1 | 11/2012 | Goswami et al. |
| 2012/0308121 A1 | 12/2012 | Datta et al. |
| 2012/0323738 A1 | 12/2012 | Goktruk et al. |
| 2013/0080423 A1 | 3/2013 | Parikh et al. |
| 2013/0080426 A1 | 3/2013 | Chen et al. |
| 2013/0085893 A1 | 4/2013 | Bhardwaj et al. |
| 2013/0114900 A1 | 5/2013 | Vedantham et al. |
| 2013/0127893 A1 | 5/2013 | Gokturk et al. |
| 2013/0132236 A1 | 5/2013 | Gokturk et al. |
| 2013/0166276 A1 | 6/2013 | Raichelgauz et al. |
| 2013/0182909 A1 | 7/2013 | Rodriguez et al. |
| 2013/0204608 A1 | 8/2013 | Baker et al. |
| 2014/0040274 A1 | 2/2014 | Aravamudan et al. |
| 2014/0046934 A1 | 2/2014 | Zhou et al. |
| 2014/0083963 A1 | 3/2014 | Wyner et al. |
| 2014/0136187 A1 | 5/2014 | Wolverton et al. |
| 2014/0152847 A1 | 6/2014 | Zomet et al. |
| 2014/0164116 A1 | 6/2014 | Popov |
| 2014/0257792 A1 | 9/2014 | Gandrabur et al. |
| 2014/0297268 A1 | 10/2014 | Govrin et al. |
| 2014/0324836 A1 | 10/2014 | Chittar et al. |
| 2014/0358906 A1 | 12/2014 | Behzadi et al. |
| 2014/0365506 A1 | 12/2014 | Gong et al. |
| 2015/0036920 A1 | 2/2015 | Wu et al. |
| 2015/0039583 A1 | 2/2015 | Liu et al. |
| 2015/0046497 A1 | 2/2015 | Campbell et al. |
| 2015/0055855 A1 | 2/2015 | Rodriguez et al. |
| 2015/0074027 A1 | 3/2015 | Huang et al. |
| 2015/0095185 A1 | 4/2015 | Katukuri et al. |
| 2015/0142704 A1 | 5/2015 | London |
| 2015/0142804 A1 | 5/2015 | Sabbouh |
| 2015/0170000 A1 | 6/2015 | Yang et al. |
| 2015/0170005 A1 | 6/2015 | Cohen et al. |
| 2015/0127632 A1 | 7/2015 | Khaitan et al. |
| 2015/0227557 A1 | 8/2015 | Holzschneider et al. |
| 2015/0254759 A1 | 9/2015 | Varadarajan |
| 2015/0269176 A1 | 9/2015 | Marantz et al. |
| 2015/0286898 A1 | 10/2015 | Di et al. |
| 2015/0324422 A1 | 11/2015 | Elder et al. |
| 2015/0340033 A1 | 11/2015 | Di Fabbrizio et al. |

(56) References Cited

U.S. PATENT DOCUMENTS

| | | |
|---|---|---|
| 2015/0363660 A1 | 12/2015 | Vidal et al. |
| 2016/0005196 A1 | 1/2016 | Awadallah et al. |
| 2016/0026871 A1 | 1/2016 | Wexler et al. |
| 2016/0034514 A1 | 2/2016 | Singhal et al. |
| 2016/0042253 A1 | 2/2016 | Sawhney et al. |
| 2016/0055237 A1 | 2/2016 | Tuzel et al. |
| 2016/0071182 A1 | 3/2016 | Nogues et al. |
| 2016/0078057 A1 | 3/2016 | Perez de la Coba |
| 2016/0092473 A1 | 3/2016 | Rodriguez-Serrano et al. |
| 2016/0092556 A1 | 3/2016 | Cooper et al. |
| 2016/0110071 A1 | 4/2016 | Brown et al. |
| 2016/0117360 A1 | 4/2016 | Kunc et al. |
| 2016/0117587 A1 | 4/2016 | Yan et al. |
| 2016/0117593 A1 | 4/2016 | London |
| 2016/0189009 A1 | 6/2016 | Tran et al. |
| 2016/0189034 A1 | 6/2016 | Shakeri et al. |
| 2016/0217157 A1 | 7/2016 | Shih et al. |
| 2016/0267359 A1 | 9/2016 | Gan et al. |
| 2016/0275376 A1 | 9/2016 | Kant |
| 2016/0283580 A1 | 9/2016 | Amacker et al. |
| 2016/0342600 A1 | 11/2016 | Salaka et al. |
| 2016/0350336 A1 | 12/2016 | Checka et al. |
| 2016/0364788 A1 | 12/2016 | Jo et al. |
| 2016/0379120 A1 | 12/2016 | Merdivan et al. |
| 2017/0060867 A1 | 3/2017 | Moutinho |
| 2017/0076206 A1 | 3/2017 | Lastras et al. |
| 2017/0083963 A1 | 3/2017 | Agarwal |
| 2017/0124527 A1 | 5/2017 | Traina et al. |
| 2017/0124590 A1 | 5/2017 | Griesmeyer |
| 2017/0124618 A1 | 5/2017 | Roeseler et al. |
| 2017/0124627 A1 | 5/2017 | Jihn |
| 2017/0193074 A1 | 7/2017 | Vellal et al. |
| 2017/0193545 A1 | 7/2017 | Zhou et al. |
| 2017/0270159 A1 | 9/2017 | Wang et al. |
| 2017/0300495 A1 | 10/2017 | Sharifi et al. |
| 2017/0300624 A1 | 10/2017 | Fink et al. |
| 2017/0344711 A1 | 11/2017 | Liu et al. |
| 2017/0364743 A1 | 12/2017 | James et al. |
| 2017/0372398 A1 | 12/2017 | Kopru et al. |
| 2018/0005293 A1 | 1/2018 | Adams et al. |
| 2018/0052842 A1 | 2/2018 | Hewavitharana et al. |
| 2018/0052884 A1 | 2/2018 | Kale et al. |
| 2018/0052885 A1 | 2/2018 | Gaskill et al. |
| 2018/0052913 A1 | 2/2018 | Gaskill et al. |
| 2018/0053069 A1 | 2/2018 | Kale et al. |
| 2018/0081880 A1 | 3/2018 | Kennedy et al. |
| 2018/0089507 A1 | 3/2018 | Desprez |
| 2018/0071779 A1 | 4/2018 | Yang et al. |
| 2018/0101742 A1 | 4/2018 | Burge et al. |
| 2018/0107682 A1 | 4/2018 | Wang et al. |
| 2018/0107685 A1 | 4/2018 | Kale et al. |
| 2018/0107902 A1 | 4/2018 | Yang et al. |
| 2018/0107917 A1 | 4/2018 | Hewavitharana et al. |
| 2018/0108066 A1 | 4/2018 | Kale et al. |
| 2018/0137551 A1 | 5/2018 | Zheng et al. |
| 2018/0239798 A1 | 8/2018 | Gupta |
| 2018/0285682 A1 | 10/2018 | Najibi et al. |
| 2018/0308487 A1 | 10/2018 | Goel et al. |
| 2018/0322208 A1 | 11/2018 | Barrios et al. |
| 2021/0166086 A1 | 6/2021 | Yang et al. |
| 2021/0224876 A1 | 7/2021 | Kale et al. |
| 2021/0224877 A1 | 7/2021 | Zheng et al. |
| 2022/0050870 A1 | 2/2022 | Kale et al. |
| 2023/0018383 A1 | 1/2023 | Yang et al. |
| 2023/0401839 A1 | 12/2023 | Kale et al. |
| 2023/0401939 A1 | 12/2023 | Hatch et al. |
| 2024/0037626 A1 | 2/2024 | Kale et al. |

FOREIGN PATENT DOCUMENTS

| | | |
|---|---|---|
| CN | 101203856 | 6/2008 |
| CN | 102395966 | 3/2012 |
| CN | 102667768 | 9/2012 |
| CN | 103003814 | 3/2013 |
| CN | 104346370 | 2/2015 |
| CN | 104871150 | 8/2015 |
| CN | 105513593 | 4/2016 |
| JP | 2009193532 | 8/2009 |
| JP | 2014041560 | 3/2014 |
| JP | WO2012160693 A1 | 7/2014 |
| JP | 5752245 | 7/2015 |
| JP | 2013045122 | 3/2023 |
| KR | 1020140050217 | 4/2014 |
| KR | 1020160105995 | 9/2016 |
| KR | 102197023 | 12/2020 |
| WO | WO-2011088053 | 7/2011 |
| WO | WO-2012160693 | 11/2012 |
| WO | 2013075316 A1 | 5/2013 |
| WO | WO-2014205231 | 12/2014 |
| WO | WO-2015172253 | 11/2015 |
| WO | WO-2018034902 | 2/2018 |
| WO | WO-2018034904 | 2/2018 |
| WO | WO-2018034928 | 2/2018 |
| WO | WO-2018034930 | 2/2018 |
| WO | WO-2018071501 | 4/2018 |
| WO | WO-2018071525 | 4/2018 |
| WO | WO-2018071764 | 4/2018 |
| WO | WO-2018089762 | 5/2018 |

OTHER PUBLICATIONS

U.S. Appl. No. 18/481,736, "Non-Final Office Action", U.S. Appl. No. 18/481,736, filed May 9, 2024, 15 pages.

U.S. Appl. No. 15/238,666, "Corrected Notice of Allowability Received for U.S. Appl. No. 15/238,666, mailed on Feb. 14, 2024", Feb. 14, 2024, 2 pages.

U.S. Appl. No. 15/238,666, "Notice of Allowance Received for U.S. Appl. No. 15/238,666, mailed on Jan. 31, 2024", Jan. 31, 2024, 5 pages.

U.S. Appl. No. 17/222,251, filed Feb. 14, 2024 , "Non-Final Office Action", U.S. Appl. No. 17/222,251, filed Feb. 14, 2024, 9 pages.

10-2019-7007548, , "Notice of Allowance received for Korean Patent Application No. 10-2019-7007548 , mailed on Sep. 23, 2020", Sep. 23, 2020, 3 pages.

10-2019-7007548, "Office Action", KR Application No. 10-2019-7007548, Apr. 29, 2020, 5 pages.

10-2019-7013953, "Notice of Allowance", KR Application No. 10-2019-7013953, Jan. 13, 2021, 7 pages.

10-2019-7013953, "Office Action", KR Application No. 10-2019-7013953, Jul. 22, 2020, 14 pages.

10-2020-7037188, "Notice of Allowance", KR Application No. 10-2020-7037188, Feb. 7, 2022, 6 pages.

10-2020-7037188, "Office Action", KR Application No. 10-2020-7037188, Sep. 27, 2021, 4 pages.

10-2020-7037188, "Office Action", KR Application No. 10-2020-7037188, Mar. 25, 2021, 6 pages.

U.S. Appl. No. 15/238,660, "Final Office Action", U.S. Appl. No. 15/238,660, filed Dec. 6, 2019, 11 pages.

U.S. Appl. No. 15/238,660, "First Action Interview Office Action", U.S. Appl. No. 15/238,660, filed Jul. 17, 2019, 22 pages.

U.S. Appl. No. 15/238,660, "First Action Interview Pre-Interview Communication", U.S. Appl. No. 15/238,660, filed Dec. 17, 2018, 21 pages.

U.S. Appl. No. 15/238,660, "Non-Final Office Action", U.S. Appl. No. 15/238,660, filed Feb. 13, 2020, 12 pages.

U.S. Appl. No. 15/238,666, "Advisory Action", U.S. Appl. No. 15/238,666, filed Jul. 22, 2020, 3 pages.

U.S. Appl. No. 15/238,666, "Advisory Action Received for U.S. Appl. No. 15/238,666, mailed on Mar. 9, 2023", Mar. 9, 2023, 3 pages.

U.S. Appl. No. 15/238,666,"Final Office Action", U.S. Appl. No. 15/238,666, filed Apr. 27, 2020, 11 pages.

U.S. Appl. No. 15/238,666, "Final Office Action", U.S. Appl. No. 15/238,666, filed Apr. 1, 2019, 12 pages.

U.S. Appl. No. 15/238,666, "Final Office Action", U.S. Appl. No. 15/238,666, filed May 24, 2022, 13 pages.

U.S. Appl. No. 15/238,666, "Final Office Action", U.S. Appl. No. 15/238,666, filed Dec. 20, 2022, 22 pages.

(56) References Cited

OTHER PUBLICATIONS

U.S. Appl. No. 15/238,666, "Final Office Action Received for U.S. Appl. No. 15/238,666, mailed on Nov. 8, 2023", Nov. 8, 2023, 17 pages.
U.S. Appl. No. 15/238,666, "First Action Interview Office Action", U.S. Appl. No. 15/238,666, filed Sep. 7, 2018, 3 pages.
U.S. Appl. No. 15/238,666, "First Action Interview Pre-Interview Communication", U.S. Appl. No. 15/238,666, filed Jul. 6, 2018, 4 pages.
U.S. Appl. No. 15/238,666, "Non Final Office Action", U.S. Appl. No. 15/238,666, filed Sep. 1, 2022, 20 pages.
U.S. Appl. No. 15/238,666, "Non-Final Office Action", U.S. Appl. No. 15/238,666, filed Nov. 1, 2019, 12 pages.
U.S. Appl. No. 15/238,666, "Non-Final Office Action", U.S. Appl. No. 15/238,666, filed Jun. 23, 2023, 20 pages.
U.S. Appl. No. 15/238,666, "Non-Final Office Action", U.S. Appl. No. 15/238,666, filed Sep. 23, 2021, 9 pages.
U.S. Appl. No. 15/238,666, "Non-Final Office Action received for U.S. Appl. No. 15/238,666, mailed on Jun. 23, 2023", Jun. 23, 2023, 20 pages.
U.S. Appl. No. 15/238,675, "Final Office Action", U.S. Appl. No. 15/238,675, filed Dec. 2, 2019, 34 pages.
U.S. Appl. No. 15/238,675, "Final Office Action", U.S. Appl. No. 15/238,675, filed Sep. 11, 2020, 37 pages.
U.S. Appl. No. 15/238,675, "Final Office Action", U.S. Appl. No. 15/238,675, filed May 5, 2021, 42 pages.
U.S. Appl. No. 15/238,675, "First Action Interview Office Action", U.S. Appl. No. 15/238,675, filed Jul. 5, 2019, 5 pages.
U.S. Appl. No. 15/238,675, "First Action Interview Pre-Interview Communication", U.S. Appl. No. 15/238,675, filed May 28, 2019, 5 pages.
U.S. Appl. No. 15/238,675, "Non-Final Office Action", U.S. Appl. No. 15/238,675, filed Apr. 28, 2020, 35 pages.
U.S. Appl. No. 15/238,675, "Non-Final Office Action", U.S. Appl. No. 15/238,675, filed Jan. 8, 2021, 40 pages.
U.S. Appl. No. 15/238,679, "Advisory Action", U.S. Appl. No. 15/238,679, filed Aug. 11, 2020, 3 pages.
U.S. Appl. No. 15/238,679, "Final Office Action", U.S. Appl. No. 15/238,679, filed Apr. 1, 2019, 11 pages.
U.S. Appl. No. 15/238,679, "Final Office Action", U.S. Appl. No. 15/238,679, filed Apr. 21, 2022, 11 pages.
U.S. Appl. No. 15/238,679, "Final Office Action", U.S. Appl. No. 15/238,679, filed May 15, 2020, 11 pages.
U.S. Appl. No. 15/238,679, "First Action Interview Office Action", U.S. Appl. No. 15/238,679, filed Sep. 7, 2018, 4 pages.
U.S. Appl. No. 15/238,679, "First Action Interview Pre-Interview Communication", U.S. Appl. No. 15/238,679, filed Jul. 2, 2018, 4 pages.
U.S. Appl. No. 15/238,679, "Non-Final Office Action", U.S. Appl. No. 15/238,679, filed Oct. 4, 2019, 11 pages.
U.S. Appl. No. 15/238,679, "Non-Final Office Action", U.S. Appl. No. 15/238,679, filed Nov. 15, 2021, 11 pages.
U.S. Appl. No. 15/294,756, "Advisory Action", U.S. Appl. No. 15/294,756, filed Apr. 9, 2021, 3 pages.
U.S. Appl. No. 15/294,756, "Advisory Action", U.S. Appl. No. 15/294,756, filed Jun. 30, 2020, 3 pages.
U.S. Appl. No. 15/294,756, "Final Office Action", U.S. Appl. No. 15/294,756, filed Jan. 21, 2021, 35 pages.
U.S. Appl. No. 15/294,756, "Final Office Action", U.S. Appl. No. 15/294,756, filed Apr. 22, 2020, 49 pages.
U.S. Appl. No. 15/294,756, "First Action Interview Office Action Summary", U.S. Appl. No. 15/294,756, filed Oct. 25, 2019, 7 pages.
U.S. Appl. No. 15/294,756, "First Action Interview Pre-Interview Communication", U.S. Appl. No. 15/294,756, filed May 23, 2019, 6 pages.
U.S. Appl. No. 15/294,756, "Non-Final Office Action", U.S. Appl. No. 15/294,756, filed Sep. 17, 2020, 27 pages.
U.S. Appl. No. 15/294,765, "Advisory Action", U.S. Appl. No. 15/294,765, filed Feb. 19, 2020, 3 pages.
U.S. Appl. No. 15/294,765, "Final Office Action", U.S. Appl. No. 15/294,765, filed Dec. 12, 2019, 18 pages.
U.S. Appl. No. 15/294,765, "Non-Final Office Action", U.S. Appl. No. 15/294,765, filed Jun. 15, 2020, 22 pages.
U.S. Appl. No. 15/294,765, "Non-Final Office Action", U.S. Appl. No. 15/294,765, filed May 2, 2019, 9 pages.
U.S. Appl. No. 15/294,765, "Notice of Allowance", U.S. Appl. No. 15/294,765, filed Jan. 1, 2021, 8 pages.
U.S. Appl. No. 15/294,767, "Advisory Action", U.S. Appl. No. 15/294,767, filed Jun. 15, 2020, 3 pages.
U.S. Appl. No. 15/294,767, "Corrected Notice of Allowability", U.S. Appl. No. 15/294,767, filed Feb. 15, 2023, 2 pages.
U.S. Appl. No. 15/294,767, "Corrected Notice of Allowability", U.S. Appl. No. 15/294,767, filed May 19, 2022, 2 pages.
U.S. Appl. No. 15/294,767, "Corrected Notice of Allowability", U.S. Appl. No. 15/294,767, filed Jul. 24, 2023, 2 pages.
U.S. Appl. No. 15/294,767, "Corrected Notice of Allowability", U.S. Appl. No. 15/294,767, filed Aug. 3, 2022, 2 pages.
U.S. Appl. No. 15/294,767, "Corrected Notice of Allowability", U.S. Appl. No. 15/294,767, filed Sep. 28, 2022, 2 pages.
U.S. Appl. No. 15/294,767, "Corrected Notice of Allowability", U.S. Appl. No. 15/294,767, filed Nov. 10, 2021, 2 pages.
U.S. Appl. No. 15/294,767, "Final Office Action", U.S. Appl. No. 15/294,767, filed Apr. 2, 2020, 17 pages.
U.S. Appl. No. 15/294,767, "Final Office Action", U.S. Appl. No. 15/294,767, filed Aug. 2, 2019, 17 pages.
U.S. Appl. No. 15/294,767,"Final Office Action", U.S. Appl. No. 15/294,767, filed Mar. 11, 2021, 18 pages.
U.S. Appl. No. 15/294,767, "Non-Final Office Action", U.S. Appl. No. 15/294,767, filed Jan. 24, 2019, 18 pages.
U.S. Appl. No. 15/294,767, "Non-Final Office Action", U.S. Appl. No. 15/294,767, filed Jul. 15, 2020, 18 pages.
U.S. Appl. No. 15/294,767, "Non-Final Office Action", U.S. Appl. No. 15/294,767, filed Oct. 25, 2019, 18 pages.
U.S. Appl. No. 15/294,767, "Notice of Allowance", U.S. Appl. No. 15/294,767, filed Jul. 1, 2022, 5 pages.
U.S. Appl. No. 15/294,767, "Notice of Allowance", U.S. Appl. No. 15/294,767, filed May 25, 2023, 7 pages.
U.S. Appl. No. 15/294,767, "Notice of Allowance", U.S. Appl. No. 15/294,767, filed Jun. 30, 2021, 7 pages.
U.S. Appl. No. 15/294,767, "Notice of Allowance", U.S. Appl. No. 15/294,767, filed Apr. 1, 2022, 8 pages.
U.S. Appl. No. 15/294,767, "Notice of Allowance", U.S. Appl. No. 15/294,767, filed Nov. 16, 2022, 8 pages.
U.S. Appl. No. 15/294,767, "Notice of Allowance Received for U.S. Appl. No. 15/294,767, mailed on Apr. 7, 2023", Apr. 7, 2023, 7 pages.
U.S. Appl. No. 15/294,767, "Notice of Allowance Received for U.S. Appl. No. 15/294,767, mailed on Jan. 27, 2023", Jan. 27, 2023, 8 pages.
U.S. Appl. No. 15/294,773, "Corrected Notice of Allowability Received for U.S. Appl. No. 15/294,773, mailed on Aug. 20, 2020", Aug. 20, 2020, 3 pages.
U.S. Appl. No. 15/294,773, "Final Office Action", U.S. Appl. No. 15/294,773, filed May 9, 2019, 20 pages.
U.S. Appl. No. 15/294,773, "Final Office Action", U.S. Appl. No. 15/294,773, filed Jan. 9, 2020, 26 pages.
U.S. Appl. No. 15/294,773, "First Action Interview—Office Action Summary", U.S. Appl. No. 15/294,773, filed Oct. 30, 2018, 6 pages.
U.S. Appl. No. 15/294,773, "First Action Interview Pre-Interview Communication", U.S. Appl. No. 15/294,773, filed May 4, 2018, 4 pages.
U.S. Appl. No. 15/294,773, "Non-Final Office Action", U.S. Appl. No. 15/294,773, filed Jul. 30, 2019, 18 pages.
U.S. Appl. No. 15/294,773, "Notice of Allowance", U.S. Appl. No. 15/294,773, filed Jul. 2, 2020, 10 pages.
U.S. Appl. No. 15/294,773, "Notice of Allowance", U.S. Appl. No. 15/294,773, filed Aug. 6, 2020, 10 pages.
U.S. Appl. No. 15/294,773, "Notice of Allowance", U.S. Appl. No. 15/294,773, filed Mar. 18, 2020, 9 pages.
U.S. Appl. No. 15/349,462, "Advisory Action", U.S. Appl. No. 15/349,462, filed Feb. 7, 2020, 3 pages.

(56) References Cited

OTHER PUBLICATIONS

U.S. Appl. No. 15/349,462, "Corrected Notice of Allowability", U.S. Appl. No. 15/349,462, filed Mar. 4, 2021, 4 pages.
U.S. Appl. No. 15/349,462, "Final Office Action", U.S. Appl. No. 15/349,462, filed Nov. 18, 2019, 6 pages.
U.S. Appl. No. 15/349,462, "Non-Final Office Action", U.S. Appl. No. 15/349,462, filed Jan. 25, 2019, 31 pages.
U.S. Appl. No. 15/349,462, "Notice of Allowance", U.S. Appl. No. 15/349,462, filed Nov. 10, 2020, 9 pages.
U.S. Appl. No. 17/091,851, "Corrected Notice of Allowability", U.S. Appl. No. 17/091,851, filed Jan. 19, 2023, 2 pages.
U.S. Appl. No. 17/091,851, "Corrected Notice of Allowability", U.S. Appl. No. 17/091,851, filed Feb. 14, 2023, 2 pages.
U.S. Appl. No. 17/091,851, "Notice of Allowance", U.S. Appl. No. 17/091,851, filed May 31, 2022, 11 pages.
U.S. Appl. No. 17/091,851, "Notice of Allowance", U.S. Appl. No. 17/091,851, filed Jul. 20, 2022, 11 pages.
U.S. Appl. No. 17/091,851, "Notice of Allowance", U.S. Appl. No. 17/091,851, filed Oct. 26, 2022, 11 pages.
U.S. Appl. No. 17/221,367, "Corrected Notice of Allowability", U.S. Appl. No. 17/221,367, filed Nov. 9, 2023, 2 pages.
U.S. Appl. No. 17/221,367, "Non-Final Office Action", U.S. Appl. No. 17/221,367, filed May 10, 2023, 9 pages.
U.S. Appl. No. 17/221,367, "Notice of Allowance", U.S. Appl. No. 17/221,367, filed Aug. 2, 2023, 7 pages.
U.S. Appl. No. 17/222,251, "Final Office Action", U.S. Appl. No. 17/222,251, filed Oct. 2, 2023, 12 pages.
U.S. Appl. No. 17/222,251, "Non-Final Office Action", U.S. Appl. No. 17/222,251, filed Apr. 10, 2023, 13 pages.
U.S. Appl. No. 17/512,389, "Corrected Notice of Allowability", U.S. Appl. No. 17/512,389, filed Aug. 11, 2023, 2 pages.
U.S. Appl. No. 17/512,389, "Corrected Notice of Allowability", U.S. Appl. No. 17/512,389, filed Sep. 27, 2023, 2 pages.
U.S. Appl. No. 17/512,389, "Non-Final Office Action Received for U.S. Appl. No. 17/512,389, mailed on Mar. 31, 2023", Mar. 31, 2023, 25 pages.
U.S. Appl. No. 17/512,389, "Notice of Allowance", U.S. Appl. No. 17/512,389, filed Jul. 11, 2023, 8 pages.
U.S. Appl. No. 17/949,953, "Notice of Allowance", U.S. Appl. No. 17/949,953, filed Jan. 31, 2023, 15 pages.
U.S. Appl. No. 17/949,953, "Notice of Allowance", U.S. Appl. No. 17/949,953, filed Apr. 4, 2023, 9 pages.
U.S. Appl. No. 17/949,953, "Notice of Allowance", U.S. Appl. No. 17/949,953, filed Jun. 1, 2023, 9 pages.
U.S. Appl. No. 17/949,953, "Notice of Allowance", U.S. Appl. No. 17/949,953, filed Sep. 13, 2023, 9 pages.
17841873.7, "Communication Pursuant to Article 94(3) EPC", EP Application No. 17841873.7, Feb. 18, 2021, 10 pages.
17841873.7, "EPO Written Decision To Refuse", EP Application No. 17841873.7, Dec. 7, 2022, 4 pages.
17841873.7, "Extended European Search Report", EP Application No. 17841873.7, Nov. 25, 2019, 11 pages.
17841873.7, ,"Summons to Attend Oral Proceeding", EP Application No. 17841873.7, May 23, 2022, 9 pages.
17841887.7, "Communication Pursuant to Article 94(3) Epc", Ep Application No. 17841887.7, Apr. 9, 2020, 7 pages.
17841887.7, "Extended European Search Report", EP Application No. 17841887.7, Jul. 3, 2019, 8 pages.
17841888.5, "Extended European Search Report", EP Application No. 17841888.5, 01/07/200, 8 pages.
17860463.3, "Communication Pursuant to Article 94(3) EPC", EP Application No. 17860463.3, Jan. 30, 2020, 7 pages.
17860463.3, "EPO Decision to Refuse", EP Application No. 17860463.3, Aug. 3, 2021, 13 pages.
17860463.3, "Extended European Search Report", EP Application No. 17860463.3, Jun. 17, 2019, 11 pages.
17860463.3, "Result of Consultation", EP Application No. 17860463.3, Jun. 18, 2021, 11 pages.
17860463.3, "Summons to Attend Oral Proceeding", EP Application No. 17860463.3, Apr. 7, 2021, 11 pages.
2017312818, "First Examination Report", AU Application No. 2017312818, Oct. 23, 2019, 5 pages.
2017312818, "Notice of Acceptance", AU Application No. 2017312818, Aug. 31, 2020, 3 pages.
2017312818, "Second Examination Report", AU Application No. 2017312818, Apr. 8, 2020, 5 pages.
2017312818, "Third Office Action", AU Application No. 2017312818, Jun. 22, 2020, 4 pages.
201780050295.5, "Office Action Received for Chinese Patent Application No. 201780050295.5, mailed on Oct. 9, 2022", Oct. 9, 2022, 8 Pages.
201780050335.6, "Office Action received for Chinese Patent Application No. 201780050335.6, mailed on Sep. 29, 2022", Sep. 29, 2022, 9 Pages.
201780057340.X, "Notice of Decision to Grant Received for Chinese Patent Application No. 201780057340.X, mailed on Apr. 27, 2023", Apr. 27, 2023, 4 Pages.
201780057340.X, "Office Action received for Chinese Patent Application No. 201780057340.X mailed on Sep. 29, 2022", Sep. 29, 2022, 9 pages.
201780063709.8, "Notice of Decision to Grant", CN Application No. 201780063709.8, Apr. 5, 2023, 4 pages.
201780063709.8, "Office Action", CN Application No. 201780063709.8, Dec. 1, 2022, 8 pages.
2019-507947, "Notice of Allowance", JP Application No. 2019-507947, Nov. 4, 2020, 6 pages.
2019-507947, "Office Action", JP Application No. 2019-507947, Apr. 7, 2020, 19 pages.
2019-520457, "Notice of Decision to Grant", JP Application No. 2019-520457, Mar. 9, 2021, 6 pages.
2019-520457, "Office Action", JP Application No. 2019-520457, Jul. 14, 2020, 7 pages.
Jiang, et al., "CSM: A Cloud Service Marketplace for Complex Service Acquisition", ACM Transactions on Intelligent Systems and Technology (TIST), Association for Computing Machinery Corporation, 2 Penn Plaza, Suite 701 New York NY 10121-0701 USA, vol. 8, No. 1, XP058275318, ISSN: 2157-6904, DOI: 10.1145/2894759, Jul. 25, 2016, 25 pages.
Kumar, et al., "Structural similarity for document image classification and retrieval", Pattern Recognition Letters 43 (2014), 2014, pp. 119-126.
Long, Jonathan et al., "Fully Convolutional Networks for Semantic Segmentation", Cornell University arXiv, arXiv.org [retrieved Aug. 1, 2023]. Retrieved from the Internet <https://arxiv.org/pdf/1411.4038.pdf>., Nov. 14, 2014, 10 pages.
Lowe, David G., "Object Recognition from Local Scale-Invariant Features", Computer Vision, 1999. The Proceedings of the Seventh IEEE International Conference, Kerkyra, Greece [retrieved Jan. 19, 2022]. Retrieved from the Internet <http://people.eecs.berkeley.edu/~efros/courses/AP06/Papers/lowe-iccv-99.pdf>., Sep. 1999, 8 pages.
Ma, et al., "Knowledge Graph Inference for spoken dialog systems", 2015 IEEE International Conference on Acoustics, Speech and Signal Processing (ICASSP), XP055250593, DOI: 10.1109/ICASSP.2015.7178992 ISBN: 978-1-4673-6997-8, Apr. 1, 2015, 5 pages.
PCT/US2017/046023, "International Preliminary Report on Patentability", PCT Application No. PCT/US2017/046023, Feb. 28, 2019, 7 pages.
PCT/US2017/046023, "International Search Report", PCT Application No. PCT/US2017/046023, Oct. 13, 2017, 2 pages.
PCT/US2017/046023, "Written Opinion", PCT Application No. PCT/US2017/046023, Oct. 13, 2017, 5 pages.
PCT/US2017/046051, "International Preliminary Report on Patentability", PCT Application No. PCT/US2017/046051, Feb. 28, 2019, 6 pages.
PCT/US2017/046051, "International Search Report", PCT Application No. PCT/US2017/046051, Oct. 31, 2017, 3 pages.
PCT/US2017/046051, "Written Opinion", US Application No. PCT/US2017/046051, Oct. 31, 2017, 4 pages.
PCT/US2017/046243, "International Preliminary Report on Patentability", PCT Application No. PCT/US2017/046243, Feb. 28, 2019, 6 pages.

(56) References Cited

OTHER PUBLICATIONS

PCT/US2017/046243, "International Search Report", PCT Application No. PCT/US2017/046243, Oct. 31, 2017, 2 pages.
PCT/US2017/046243, "Written Opinion", PCT Application No. PCT/US2017/046243, Oct. 31, 2017, 4 pages.
PCT/US2017/046253, "International Preliminary Report on Patentability", PCT Application No. PCT/US2017/046253, Feb. 28, 2019, 7 pages.
PCT/US2017/046253, "International Search Report", PCT Application No. PCT/US2017/046253, Oct. 20, 2017, 2 pages.
PCT/US2017/046253, "Written Opinion", PCT Application No. PCT/US2017/046253, Oct. 20, 2017, 5 pages.
PCT/US2017/056079, "International Preliminary Report on Patentability", PCT Application No. PCT/US2017/056079, Apr. 25, 2019, 7 pages.
PCT/US2017/056079, "International Search Report received for PCT Application No. PCT/US2017/056079, mailed on Dec. 22, 2017", Dec. 22, 2017, 3 Pages.
PCT/US2017/056079, "Written Opinion received for PCT Application No. PCT/US2017/056079, mailed on Dec. 22, 2017", Dec. 22, 2017, 5 Pages.
PCT/US2017/056116, "International Preliminary Report on Patentability", PCT Application No. PCT/US2017/056116, Apr. 25, 2019, 7 pages.
PCT/US2017/056116, "International Search Report received for PCT Application No. PCT/US2017/056116, mailed on Jan. 9, 2018", Jan. 9, 2018, 2 Pages.
PCT/US2017/056116, "Written Opinion received for PCT Application No. PCT/US2017/056116, mailed on Jan. 9, 2018", Jan. 9, 2018, 5 Pages.
PCT/US2017/056508, "International Preliminary Report on Patentability", PCT Application No. PCT/US2017/056508, Apr. 25, 2019, 9 pages.
PCT/US2017/056508, "International Search Report", PCT Application No. PCT/US2017/056508, Jan. 17, 2018, 4 pages.
PCT/US2017/056508, "International Written Opinion", PCT Application No. PCT/US2017/056508, Jan. 17, 2018, 7 pages.
PCT/US2017/056532, "International Preliminary Report on Patentability", PCT Application No. PCT/US2017/056532, Apr. 25, 2019, 6 pages.
PCT/US2017/056532, "International Search Report", PCT Application No. PCT/US2017/056532, Jan. 16, 2018, 3 pages.
PCT/US2017/056532, "Written Opinion", PCT Application No. PCT/US2017/056532, Jan. 16, 2018, 4 pages.
PCT/US2017/061053, "International Preliminary Report on Patentability", PCT Application No. PCT/US2017/061053, May 23, 2019, 6 pages.
PCT/US2017/061053, "International Search Report", PCT Application No. PCT/US2017/061053, Jan. 18, 2018, 2 pages.
PCT/US2017/061053, "Written Opinion", PCT Application No. Written PCT/US2017/061053, Jan. 18, 2018, 4 pages.
Zheng, et al., "Conditional Random Fields as Recurrent Neural Networks", Retrieved from the internet URL:<http://www.robots.ox.ac.uk/~szheng/papers/CRFasRNN.pdf>, 2015, 17 Pages.
Zheng, "Evaluating Machine Learning Models", A Beginner's Guide to Key Concepts and Pitfalls, Retrieved from URL: <https://www.oreilly.com/content/evaluating-machine-learning-models/>, Oct. 21, 2015, 50 pages.
U.S. Appl. No. 17/222,251, "Notice of Allowance", U.S. Appl. No. 17/222,251, filed Oct. 17, 2024, 10 pages.
U.S. Appl. No. 18/481,736, "Advisory Action", U.S. Appl. No. 18/481,736, filed Nov. 8, 2024, 7 pages.
U.S. Appl. No. 18/481,736, "Final Office Action", U.S. Appl. No. 18/481,736, filed Aug. 20, 2024, 22 pages.

INTELLIGENT ONLINE PERSONAL ASSISTANT WITH OFFLINE VISUAL SEARCH DATABASE

CROSS-REFERENCE TO RELATED APPLICATIONS

This application is a continuation of U.S. patent application Ser. No. 17/512,389, filed on Oct. 27, 2021, which is a continuation of U.S. patent application Ser. No. 15/294,767, filed on Oct. 16, 2016, these applications are hereby incorporated by reference in their entirety.

This application is related by subject matter to a commonly assigned and simultaneously filed application sharing a common specification: U.S. patent application Ser. No. 15/294,765, filed on Oct. 16, 2016, "Intelligent Online Personal Assistant With Multi-Turn Dialog Based On Visual Search", which is hereby incorporated by reference in its entirety. The following commonly assigned applications are also each hereby incorporated by reference in its entirety:

U.S. patent application Ser. No. 15/238,666, filed on Aug. 16, 2016, "Selecting Next User Prompt Types In An Intelligent Online Personal Assistant Multi-Turn Dialog,"

U.S. patent application Ser. No. 15/238,675, filed on Aug. 16, 2016, "Intelligent Online Personal Assistant With Natural Language Understanding,"

U.S. patent application Ser. No. 15/238,660, filed on Aug. 16, 2016, "Generating Next User Prompts In An Intelligent Online Personal Assistant Multi-Turn Dialog," and U.S. patent application Ser. No. 15/238,679, filed on Aug. 16, 2016, "Knowledge Graph Construction For Intelligent Online Personal Assistant."

The following articles are also each incorporated by reference in its entirety:

Jonathan Long, Evan Shelhamer, Trevor Darrell, "Fully Convolutional Networks for Semantic Segmentation", CVPR, June 2015.

Shuai Zheng et al., "Conditional Random Fields as Recurrent Neural Networks", IEEE International Conference on Computer Vision (ICCV), 2015.

BACKGROUND

Traditional searching is text-based rather than image-based or voice-based. Searching is overly time-consuming when too many irrelevant results must be presented, browsed, and rejected by a user. The technical limitations of conventional search tools make it difficult for a user to communicate search intent, for example by sharing photos of interesting products, to help start a search that may be refined by further user input, such as in a multi-turn dialog. As online searches balloon to billions of possible selectable products, comparison searching has become more important than ever, but current text-based solutions were not designed for this scale. Irrelevant results are often shown and do not bring out the best results. Traditional forms of comparison searching (search+refinement+browse) are no longer useful.

BRIEF SUMMARY

In one example, an intelligent personal assistant system includes scalable artificial intelligence (AI) that permeates the fabric of existing messaging platforms to provide an intelligent online personal assistant (or "bot"). The system may leverage existing inventories and curated databases to provide intelligent, personalized answers in predictive turns of communication between a human user and an intelligent online personal assistant. One example of an intelligent personal assistant system includes a knowledge graph. Machine learning components may continuously identify and learn from user intents so that user identity and understanding is enhanced over time. The user experience thus provided is inspiring, intuitive, unique, and may be focused on the usage and behavioral patterns of certain age groups, such as millennials, for example.

BRIEF DESCRIPTION OF THE SEVERAL VIEWS OF THE DRAWINGS

The drawings illustrate generally, by way of example, but not by way of limitation, various embodiments discussed in the present document. In order more easily to identify the discussion of any particular element or act, the most significant digit or digits in a reference number refer to the figure number in which that element is first introduced.

DETAILED DESCRIPTION

Figure 1:
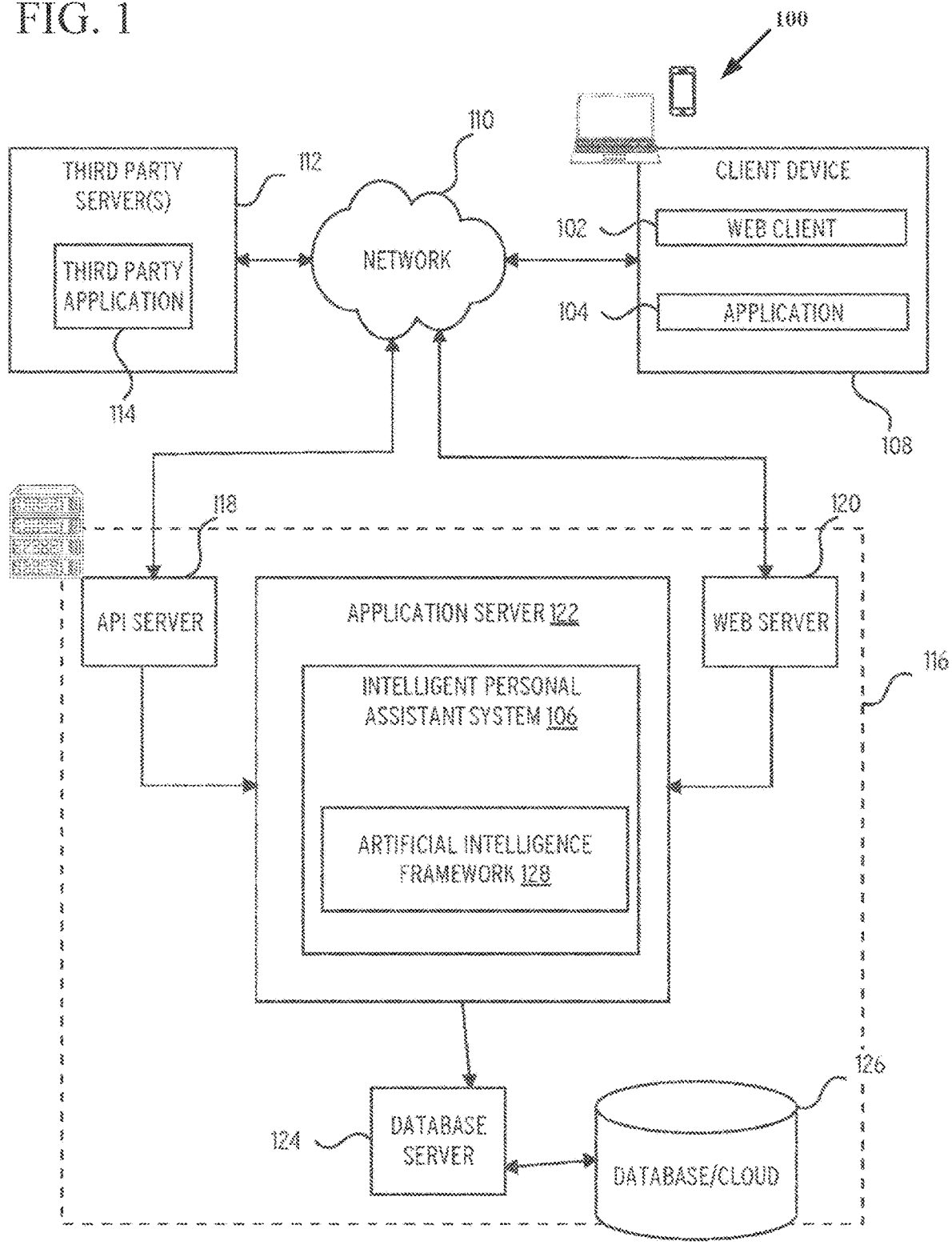
FIG. 1 shows a networked system, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" will also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, eBay Inc, All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes and application server 122, which in turn hosts an intelligent personal assistant system 106 that provides a number of functions and services to the application 104 that accesses the networked system 116. The application 104 also provides a number of interfaces described herein, which present output of the tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled to, and provide programmatic and web interfaces respectively, to the application server 122. The application server 122 hosts an intelligent personal assistant system 106, which includes components or applications. The application server 122 is, in turn, shown to be coupled to a database server 124 that facilitates access to information storage repositories (e.g., a database/cloud 126). In an example embodiment, the database/cloud 126 includes storage devices that store information accessed and generated by the intelligent personal assistant system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., intelligent personal assistant system 106) via the web interface supported by the web server 120. Similarly, the application 104 (e.g., an "app") accesses the various services and functions provided by the intelligent personal assistant system 106 via the programmatic interface provided by the Application Program Interface (API) server 118. The application 104 may, for example, an "app" executing on a client device 108, such as an iOS or Android OS application to enable user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The intelligent personal assistant system 106 could also be implemented as a standalone software program, which does not necessarily have networking capabilities.

Figure 2:
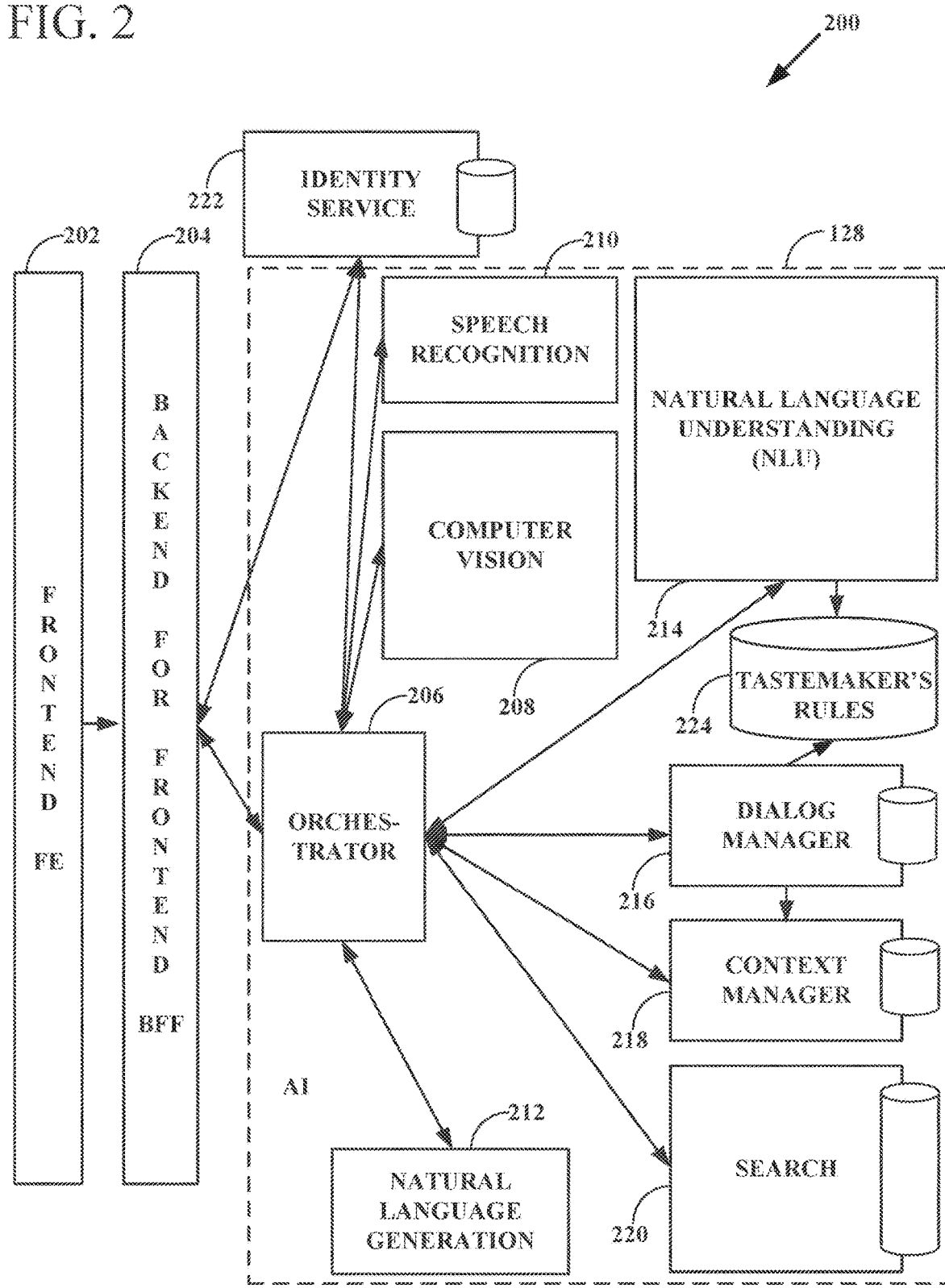
FIG. 2 shows a general architecture of an intelligent personal assistant system, according to some example embodiments.

FIG. 2 is a block diagram showing the general architecture of an intelligent personal assistant system 106, according to some example embodiments. Specifically, the intelligent personal assistant system 106 is shown to include a front end component 202 (FE) by which the intelligent personal assistant system 106 communicates (e.g., over the network 110) with other systems within the SaaS network architecture 100. The front end component 202 can communicate with the fabric of existing messaging systems. As used herein, the term messaging fabric refers to a collection of APIs and services that can power third party platforms such as Facebook messenger, Microsoft Cortana and other "bots". In one example, a messaging fabric can support an online commerce ecosystem that allows users to interact with commercial intent. Output of the front end component 202 can be rendered in a display of a client device, such as the client device 108 in FIG. 1 as part of an interface with an intelligent personal assistant, or "bot".

The front end component 202 of the intelligent personal assistant system 106 is coupled to a back end component 204 for the front end (BFF) that operates to link the front end component 202 with an artificial intelligence framework 128. The artificial intelligence framework 128 may include several components as discussed below. The data exchanged between various components and the function of each component may vary to some extent, depending on the particular implementation.

In one example of an intelligent personal assistant system 106, an AI orchestrator 206 orchestrates communication between components inside and outside the artificial intelligence framework 128. Input modalities for the AI orchestrator 206 may be derived from a computer vision component 208, a speech recognition component 210, and a text normalization component which may form part of the speech recognition component 210, for example. The computer vision component 208 may identify objects and attributes from visual input (e.g., a photo). The speech recognition component 210 may convert audio signals (e.g., spoken utterances) into text. A text normalization component may operate to make input normalization, such as language normalization by rendering emoticons into text, for example. Other normalization is possible such as orthographic normalization, foreign language normalization, conversational text normalization, and so forth.

The artificial intelligence framework 128 further includes a natural language understanding or NLU component 214 that operates to extract user intent and various intent parameters. The NLU component 214 is described in further detail beginning with FIG. 8.

The artificial intelligence framework 128 further includes a dialog manager 216 that operates to understand a "completeness of specificity" (for example of an input, such as a search query or utterance) and decide on a next action type and a related parameter (e.g., "search" or "request further information from user"). For convenience, all user inputs in this description may be referred to as "utterances", whether in text, voice, or image-related formats.

In one example, the dialog manager 216 operates in association with a context manager 218 and a Natural Language Generation (NLG) component 212. The context manager 218 manages the context and communication of a user with respect to the intelligent online personal assistant (or "bot") and the assistant's associated artificial intelligence. The context manager 218 retains a short term history of user interactions. A longer term history of user preferences may be retained in an identity service 222, described below. Data entries in one or both of these histories may include the relevant intent and all parameters, and all related results of a given input, bot interaction, or turn of communication, for example. The NLG component 212 operates to compose a natural language utterance out of an AI message to present to a user interacting with the intelligent bot.

A search component 220 is also included within the artificial intelligence framework 128. The search component 220 may have front and back end units. The back end unit may operate to manage item or product inventory and provide functions of searching against the inventory, optimizing towards a specific tuple of user intent and intent parameters. The search component 220 is designed to serve several billion queries per day globally against very large high quality inventories. The search component 220 can accommodate text, or Artificial Intelligence (AI) encoded voice and image inputs and identify relevant inventory items to users based on explicit and derived query intents.

An identity service 222 component operates to manage user profiles, for example explicit information in the form of user attributes, e.g., "name", "age", "gender", "geolocation", but also implicit information in forms such as "information distillates" such as "user interest", or "similar persona", and so forth. The artificial intelligence framework 128 may comprise part of or operate in association with, the identity service 222. The identity service 222 includes a set of policies, APIs, and services that elegantly centralizes all user information, helping the artificial intelligence framework 128 to have "intelligent" insights into user intent. The identity service 222 can protect online retailers and users from fraud or malicious use of private information.

The identity service 222 of the present disclosure provides many advantages. The identity service 222 is a single central repository containing user identity and profile data. It may continuously enrich the user profile with new insights and updates. It uses account linking and identity federation to map relationships of a user with a company, household, other accounts (e.g., core account), as well as a user's social graph of people and relationships. The identity service 222 evolves a rich notification system that communicates all and only the information the user wants at the times and media they choose.

In one example, the identity service 222 concentrates on unifying as much user information as possible in a central clearinghouse for search, AI, merchandising, and machine learning models to maximize each component's capability to deliver insights to each user. A single central repository contains user identity and profile data in a meticulously detailed schema. In an onboarding phase, the identity service 222 primes a user profile and understanding by mandatory authentication in a bot application. Any public information available from the source of authentication (e.g., social media) may be loaded. In sideboarding phases, the identity service 222 may augment the profile with information about the user that is gathered from public sources, user behaviors, interactions, and the explicit set of purposes the user tells the AI (e.g., shopping missions, inspirations, preferences). As the user interacts with the artificial intelligence framework 128, the identity service 222 gathers and infers more about the user and stores the explicit data, derived information, and updates probabilities and estimations of other statistical inferences. Over time, in profile enrichment phases, the identity service 222 also mines behavioral data such as clicks, impressions, and browse activities for derived information such as tastes, preferences, and shopping verticals. In identity federation and account linking phases, when communicated or inferred, the identity service 222 updates the user's household, employer, groups, affiliations, social graph, and other accounts, including shared accounts.

The functionalities of the artificial intelligence framework 128 can be grouped into multiple parts, for example decisioning and context parts. In one example, the decisioning part includes operations by the AI orchestrator 206, the NLU component 214, the dialog manager 216, the NLG component 212, the computer vision component 208 and speech recognition component 210. The context part of the AI functionality relates to the parameters (implicit and explicit) around a user and the communicated intent (for example, towards a given inventory, or otherwise). In order to measure and improve AI quality over time, the artificial intelligence framework 128 may be trained using sample queries (e.g., a dev set) and tested on a different set of queries (e.g., an eval set), where both sets may be developed by human curation. Also, the artificial intelligence framework 128 may be trained on transaction and interaction flows defined by experienced curation specialists, or human tastemaker override rules 224. The flows and the logic encoded within the various components of the artificial intelligence framework 128 define what follow-up utterance or presentation (e.g., question, result set) is made by the intelligent assistant based on an identified user intent.

Reference is made further above to example input modalities of the intelligent online personal assistant or bot in an intelligent personal assistant system 106. The intelligent personal assistant system 106 seeks to understand a user's intent (e.g., targeted search, compare, shop/browse, and so forth) and any mandatory parameters (e.g., product, product category, item, and so forth) and/or optional parameters (e.g., explicit information such as attributes of item/product, occasion, and so forth) as well as implicit information (e.g., geolocation, personal preferences, age, and gender, and so forth) and respond to the user with a well thought out or "intelligent" response. Explicit input modalities may include text, speech, and visual input and can be enriched with implicit knowledge of user (e.g., geolocation, previous browse history, and so forth). Output modalities can include text (such as speech, or natural language sentences, or product-relevant information, and images on the screen of a smart device, e.g., client device 108. Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. The user may not know what an item is called, or it may be hard or even impossible to use text for fine detailed information that only an expert may know, for example a complicated pattern in apparel or a certain style in furniture. Moreover, it is inconvenient to type complex text queries on mobile phones, and long text queries typically have poor recall. Thus, key functionalities of the computer vision component 208 may include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

In one example, the dialog manager 216 has as subcomponents the context manager 218 and the NLG component 212. As mentioned above, the dialog manager 216 operates to understand the "completeness of specificity" and deciding on a next action type and parameter (e.g., "search" or "request further information from user"). The context manager 218 operates to manage the context and communication of a given user towards the bot and its AI. The context manager 218 comprises two parts: a long term history and a short term memory. Each context manager entry may describe the relevant intent and all parameters and all related results. The context is towards the inventory, as well as towards other, future sources of knowledge. The NLG component 212 operates to compose a natural language utterance out of an AI message to present to a user interacting with the intelligent bot.

Fluent, natural, informative, and even entertaining dialog between man and machine is a difficult technical problem that has been studied for much of the past century yet is still considered unsolved. However, recent developments in AI have produced useful dialog systems such as Siri™ and Alexa™.

In an ecommerce example of an intelligent bot, an initial very helpful element in seeking to solve this problem is to leverage enormous sets of e-commerce data. Some of this data may be retained in proprietary databases or in the cloud e.g., database/cloud 126. Statistics about this data may be communicated to dialog manager 216 from the search component 220 as context. The artificial intelligence framework 128 may act directly upon utterances from the user, which may be run through speech recognition component 210, then the NLU component 214, and then passed to context manager 218 as semi-parsed data. The NLG component 212 may thus help the dialog manager 216 generate human-like questions and responses in text or speech to the user. The context manager 218 maintains the coherency of multi-turn and long term discourse between the user and the artificial intelligence framework 128.

Discrimination may be recommended to poll a vast e-commerce dataset for only relevant, useful information. In one example, the artificial intelligence framework 128 uses results from the search component 220 and intelligence within the search component 220 to provide this information. This information may be combined with the history of interaction from the context manager 218. The artificial intelligence framework 128 then may decide on the next turn of dialog, e.g., whether it should be a question, or a "grounding statement" to validate, for example, an existing understanding or user intent, or an item recommendation (or, for example, any combination of all three). These decisions may be made by a combination of the dataset, the chat history of the user, and a model of the user's understanding. The NLG component 212 may generate language for a textual or spoken reply to the user based on these decisions.

Technical solutions provided by the present inventive subject matter allow users to communicate with an intelligent online personal assistant in a natural conversation. The assistant is efficient as over time it increasingly understands specific user preferences and is knowledgeable about a wide range of products. Though a variety of convenient input modalities, a user can share photos, or use voice or text, and the assisted user experience may be akin to talking to a trusted, knowledgeable human shopping assistant in a high-end store, for example.

Conventionally, the approach and data used by online shopping systems aim at a faceless demographic group of buyers with blunt, simplified assumptions to maximize short-term revenue. Conventional sites and apps do not understand how, why, and when users want to be notified. Notifications may be annoying, inappropriate, and impersonal, oblivious to each user's preferences. One person is not the same as a single account. People share accounts and devices. Passwords make platforms neither safe nor easy to use. Problems of weak online identity and the ignoring of environmental signals (such as device, location, notification after anomalous behavior) make it easy to conduct fraud in the marketplace.

Figure 3:
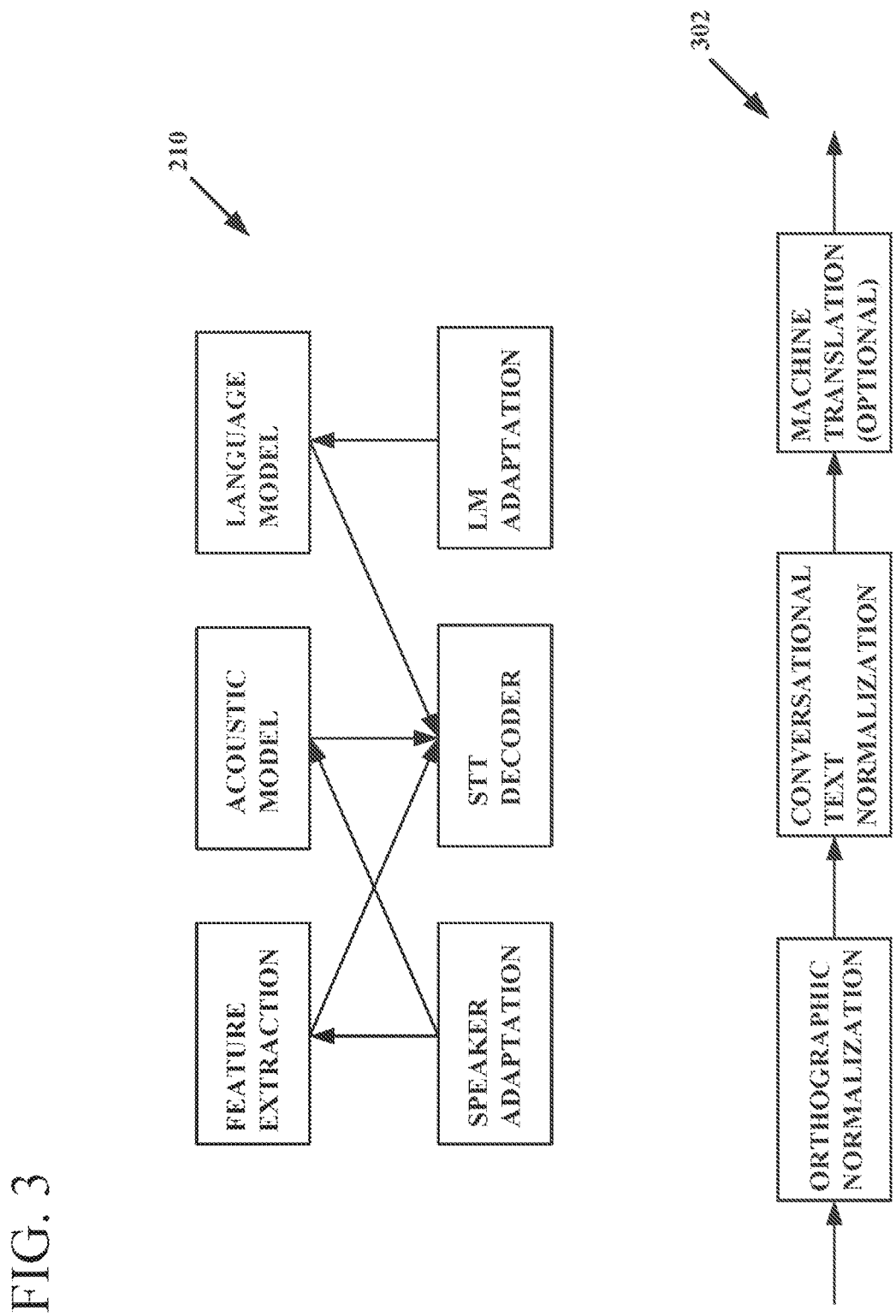
FIG. 3 shows components of a speech recognition component, according to some example embodiments.

With reference to FIG. 3, the illustrated components of the speech recognition component 210 are now described. A feature extraction component operates to convert raw audio waveform to some-dimensional vector of numbers that represents the sound. This component uses deep learning to project the raw signal into a high-dimensional semantic space. An acoustic model component operates to host a statistical model of speech units, such as phonemes and allophones. These can include Gaussian Mixture Models (GMM) although the use of Deep Neural Networks is possible. A language model component uses statistical models of grammar to define how words are put together in a sentence. Such models can include n-gram-based models or Deep Neural Networks built on top of word embeddings. A speech-to-text (STT) decoder component may convert a speech utterance into a sequence of words typically leveraging features derived from a raw signal using the feature extraction component, the acoustic model component, and the language model component in a Hidden Markov Model (HMM) framework to derive word sequences from feature sequences. In one example, a speech-to-text service in the cloud (e.g., database/cloud 126) has these components deployed in a cloud framework with an API that allows audio samples to be posted for speech utterances and to retrieve the corresponding word sequence. Control parameters are available to customize or influence the speech-to-text process.

In one example of an artificial intelligence framework 128, two additional parts for the speech recognition component 210 are provided, a speaker adaptation component and a Language Model (LM) adaptation component. The speaker adaptation component allows clients of an STT system (e.g., speech recognition component 210) to customize the feature extraction component and/or the acoustic model component for each speaker/user. This can be important because most speech-to-text systems are trained on data from a representative set of speakers from a target region and typically the accuracy of the system depends heavily on how well the target speaker matches the speakers in the training pool. The speaker adaptation component allows the speech recognition component 210 (and consequently the artificial intelligence framework 128) to be robust to speaker variations by continuously learning the idiosyncrasies of a user's intonation, pronunciation, accent, and other speech factors, and apply these to the speech-dependent components, e.g., the feature extraction component, and the acoustic model component. While this approach may require a small voice profile to be created and persisted for each speaker, the potential benefits of accuracy generally far outweigh the storage drawbacks.

The LM adaptation component operates to customize the language model component and the speech-to-text vocabulary with new words and representative sentences from a target domain, for example, inventory categories or user personas. This capability allows the artificial intelligence framework 128 to be scalable as new categories and personas are supported.

FIG. 3 also shows a flow sequence 302 for text normalization in an artificial intelligence framework 128. A text normalization component performing the flow sequence 302 is included in the speech recognition component 210 in one example. Key functionalities in the flow sequence 302 include orthographic normalization (to handle punctuation, numbers, case, and so forth), conversational text normalization (to handle informal chat-type text with acronyms, abbreviations, incomplete fragments, slang, and so forth), and machine translation (to convert a normalized sequence of foreign-language words into a sequence of words in an operating language, including but not limited to English for example).

The artificial intelligence framework 128 facilitates modern communications. Millennials for example often want to communicate via photos, voice, and text. The technical ability of the artificial intelligence framework 128 to use multiple modalities allows the communication of intent instead of just text. The artificial intelligence framework 128 provides technical solutions and is efficient. It is faster to interact with a smart personal assistant using voice commands or photos than text in many instances.

Figure 4:
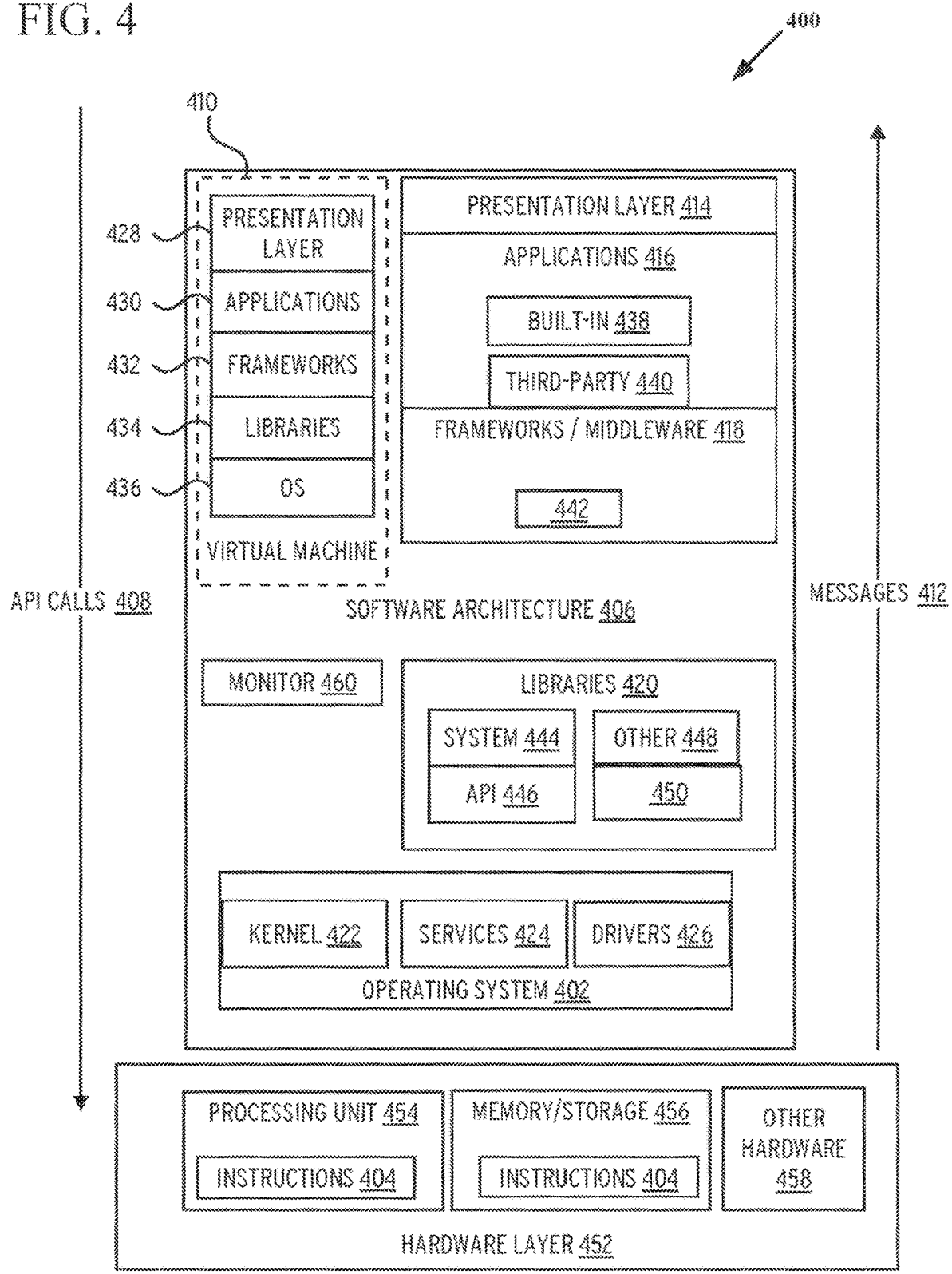
FIG. 4 shows a representative software architecture software architecture, which may be used in conjunction with various hardware architectures described herein.

FIG. 4 is a block diagram illustrating an example software architecture 406, which may be used in conjunction with various hardware architectures described herein. FIG. 4 is a non-limiting example of a software architecture, and it will be appreciated that many other architectures may be implemented to facilitate the functionality described herein. The software architecture 406 may execute on hardware such as machine 500 of FIG. 5 that includes, among other things, processors 504, memory 514, and input/output (I/O) components 518. A representative hardware layer 452 is illustrated and can represent, for example, the machine 500 of FIG. 5. The representative hardware layer 452 includes a processing unit 454 having associated executable instructions 404. Executable instructions 404 represent the executable instructions of the software architecture 406, including implementation of the methods, components and so forth described herein. The hardware layer 452 also includes memory and/or storage modules memory/storage 456, which also have executable instructions 404. The hardware layer 452 may also comprise other hardware 458.

In the example architecture of FIG. 4, the software architecture 406 may be conceptualized as a stack of layers where each layer provides particular functionality. For example, the software architecture 406 may include layers such as an operating system 402, libraries 420, applications 416 and a presentation layer 414. Operationally, the applications 416 and/or other components within the layers may invoke application programming interface (API) calls 408 through the software stack and receive a response as in response to the API calls 408. The layers illustrated are representative in nature and not all software architectures have all layers. For example, some mobile or special purpose operating systems may not provide a frameworks/ middleware 418, while others may provide such a layer. Other software architectures may include additional or different layers.

The operating system 402 may manage hardware resources and provide common services. The operating system 402 may include, for example, a kernel 422, services 424 and drivers 426. The kernel 422 may act as an abstraction layer between the hardware and the other software layers. For example, the kernel 422 may be responsible for memory management, processor management (e.g., scheduling), component management, networking, security settings, and so on. The services 424 may provide other common services for the other software layers. The drivers 426 are responsible for controlling or interfacing with the underlying hardware. For instance, the drivers 426 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 420 provide a common infrastructure that is used by the applications 416 and/or other components and/or layers. The libraries 420 may provide functionality that allows other software components to perform tasks in an easier fashion than to interface directly with the underlying operating system 402 functionality (e.g., kernel 422, services 424, and/or drivers 426). The libraries 420 may include system libraries 444 (e.g., C standard library) that may provide functions such as memory allocation functions, string manipulation functions, mathematical functions, and the like. In addition, the libraries 420 may include API libraries 446 such as media libraries (e.g., libraries to support presentation and manipulation of various known media formats such as MPREG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 420 may also include a wide variety of other libraries 448 to provide many other APIs to the applications 416 and other software components/modules.

The frameworks frameworks/middleware 418 (also sometimes referred to as middleware) may provide a higher-level common infrastructure that may be used by the applications 416 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be utilized by the applications 416 and/or other software components/modules, some of which may be specific to a particular operating system or platform.

The applications 416 include built-in applications 438 and/or third-party applications 440. Examples of representative built-in applications 438 may include, but are not limited to, a contacts application, a browser application, a book reader application, a location application, a media application, a messaging application, and/or a game application. Third-party applications 440 may include any an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 440 may invoke the API calls 408 provided by the mobile operating system (such as operating system 402) to facilitate functionality described herein.

The applications 416 may use built in operating system functions (e.g., kernel 422, services 424 and/or drivers 426), libraries 420, and frameworks/middleware 418 to create user interfaces to interact with users of the system. Alternatively, or additionally, in some systems interactions with a user may occur through a presentation layer, such as presentation layer 414. In these systems, the application/component "logic" can be separated from the aspects of the application/component that interact with a user.

Some software architectures use virtual machines. In the example of FIG. 4, this is illustrated by a virtual machine 410. The virtual machine 410 creates a software environment where applications/components can execute as if they were executing on a hardware machine (such as the machine 500 of FIG. 5, for example). The virtual machine 410 is hosted by a host operating system (operating system (OS) 436 in FIG. 4) and typically, although not always, has a virtual machine monitor 460, which manages the operation of the virtual machine as well as the interface with the host operating system (e.g., operating system 402). A software architecture executes within the virtual machine 410 such as an operating system operating system (OS) 436, libraries 434, frameworks 432, applications 430 and/or presentation layer 428. These layers of software architecture executing within the virtual machine 410 can be the same as corresponding layers previously described or may be different.

Figure 5:
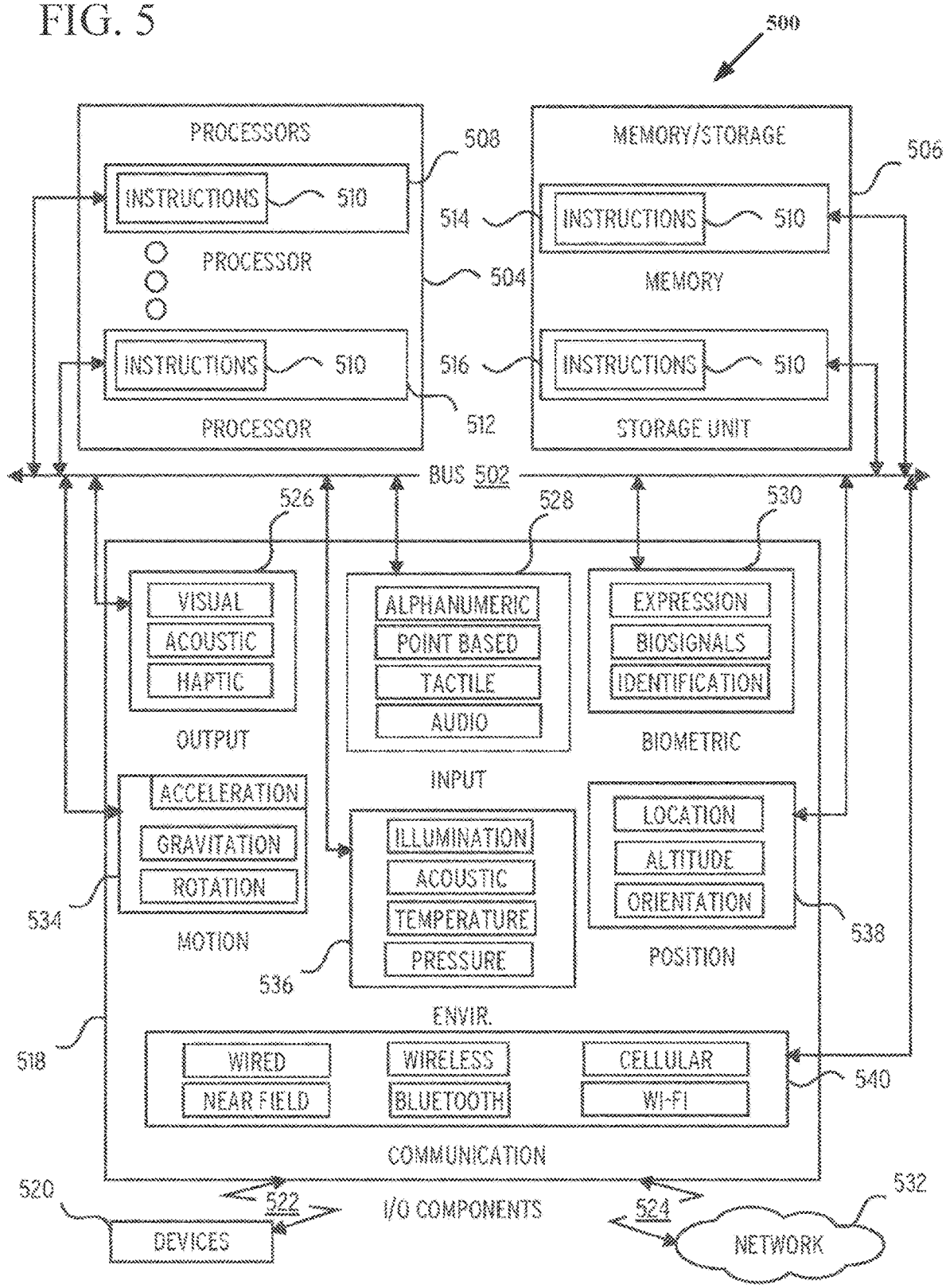
FIG. 5 shows components of a machine, according to some example embodiments, able to read instructions from a machine-readable medium (e.g., a computer-readable storage medium) and perform any one or more of the methodologies discussed herein.

FIG. 5 is a block diagram illustrating components of a machine 500, according to some example embodiments, which is able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 510, sequentially or otherwise, that specify actions to be taken by machine 500. Further, while only a single machine 500 is illustrated, the term "machine" will also be taken to include a collection of machines that individually or jointly execute the instructions 510 to perform any one or more of the methodologies discussed herein.

The machine 500 may include processors 504, memory memory/storage 506, and I/O components 518, which may be configured to communicate with each other such as via a bus 502. The memory/storage 506 may include a memory 514, such as a main memory, or other memory storage, and a storage unit 516, both accessible to the processors 504 such as via the bus 502. The storage unit 516 and memory 514 store the instructions 510 embodying any one or more of the methodologies or functions described herein. The instructions 510 may also reside, completely or partially, within the memory 514, within the storage unit 516, within at least one of the processors 504 (e.g., within the processor's cache memory), or any suitable combination thereof, during execution thereof by the machine 500. Accordingly, the memory 514, the storage unit 516, and the memory of processors 504 are examples of machine-readable media.

The I/O components 518 may include a wide variety of components to receive input, provide output, produce output, transmit information, exchange information, capture measurements, and so on. The specific I/O components 518 that are included in a particular machine will depend on the type of machine. For example, portable machines such as mobile phones will likely include a touch input device or other such input mechanisms, while a headless server machine will likely not include such a touch input device. It will be appreciated that the I/O components 518 may include many other components that are not shown in FIG. 5. The I/O components 518 are grouped according to functionality merely for simplifying the following discussion and the grouping is in no way limiting. In various example embodiments, the I/O components 518 may include output components 526 and input components 528. The output components 526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 518 may include biometric components 530, motion components 534, environmental environment components 536, or position components 538 among a wide array of other components. For example, the biometric components 530 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 534 may include acceleration sensor components (e.g., accelerometer), gravitation sensor components, rotation sensor components (e.g., gyroscope), and so forth. The environment components 536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 518 may include communication components 540 operable to couple the machine 500 to a network 532 or devices 520 via coupling 522 and coupling 524 respectively. For example, the communication components 540 may include a network interface component or other suitable device to interface with the network 532. In further examples, communication components 540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 520 may be another machine or any of a wide variety of peripheral devices (e.g., a peripheral device coupled via a Universal Serial Bus (USB)).

Moreover, the communication components 540 may detect identifiers or include components operable to detect identifiers. For example, the communication components processors communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 540, such as, location via Internet Protocol (IP) geo-location, location via Wi-Fi® signal triangulation, location via detecting an NFC beacon signal that may indicate a particular location, and so forth.

Figure 6:
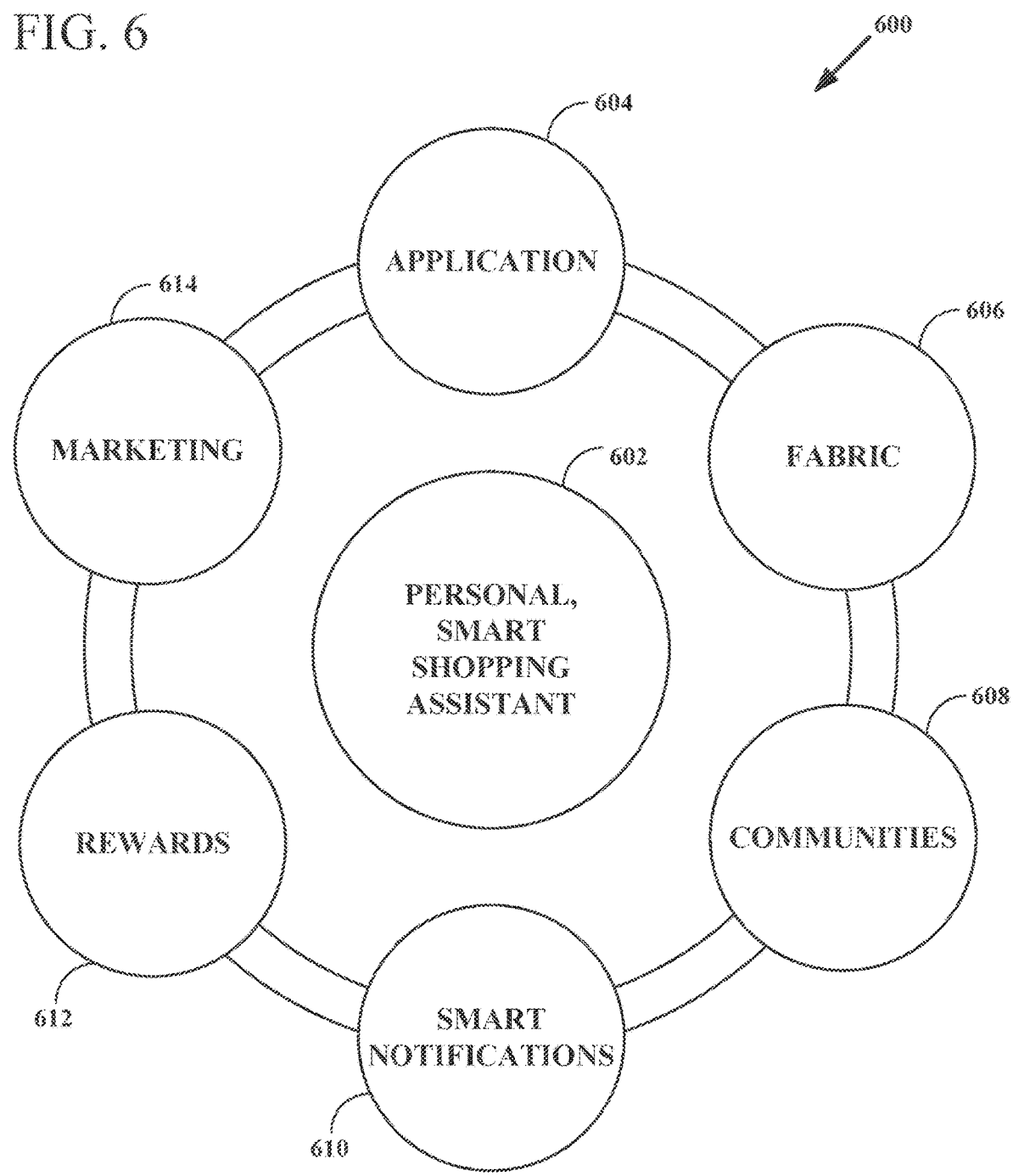
FIG. 6 shows an example environment into which an intelligent online personal assistant can be deployed, according to some example embodiments.

With reference now to FIG. 6, an example environment 600 into which an intelligent online personal assistant provided by the intelligent personal assistant system 106 can be deployed is shown. At the center of the environment 600, the intelligent bot 602 with AI appears. The bot leverages the computer vision component 208, the speech recognition component 210, the NLU component 214, the dialog manager 216, the NLG component 212, the search component 220, and identity service 222 to engage users in efficient, interesting, and effective dialog to decode their intent and deliver personalized results.

An associated application 604 can showcase the bot 602's full power and intelligence with compelling mobile design capabilities and elements. The fabric 606 integrates with Facebook Messenger™, Skype™, and Cortana™ (for example) to enable users to transact where they are already spending time. A smart notifications 610 platform delivers the right information at the right time via any number of channels (e.g., SMS, push notification, email, messaging) to users to encourage them to engage with the bot 602 and associated marketplaces. Communities 608 features enable users to connect, engage, and interact with their friends, tastemakers, and brands using the same messaging systems in which they already spend most of their time. Other features include group buying and gift buying. A rewards 612 platform incentivizes users to engage more deeply with the bot 602. Rewards can include deep discounts on products, access to unique inventory, and recognition in the app through scores, levels, etc. At marketing 614, a combination of traditional, social and other marketing is performed to win the attention of some populations (e.g., millennials) in more personal ways. Conventional techniques can include merchandising, email, search engine optimization (SEO), and search engine marketing (SEM) as well as experimental techniques such as social ads, viral coupons, and more to target new and existing users.

Figure 7:
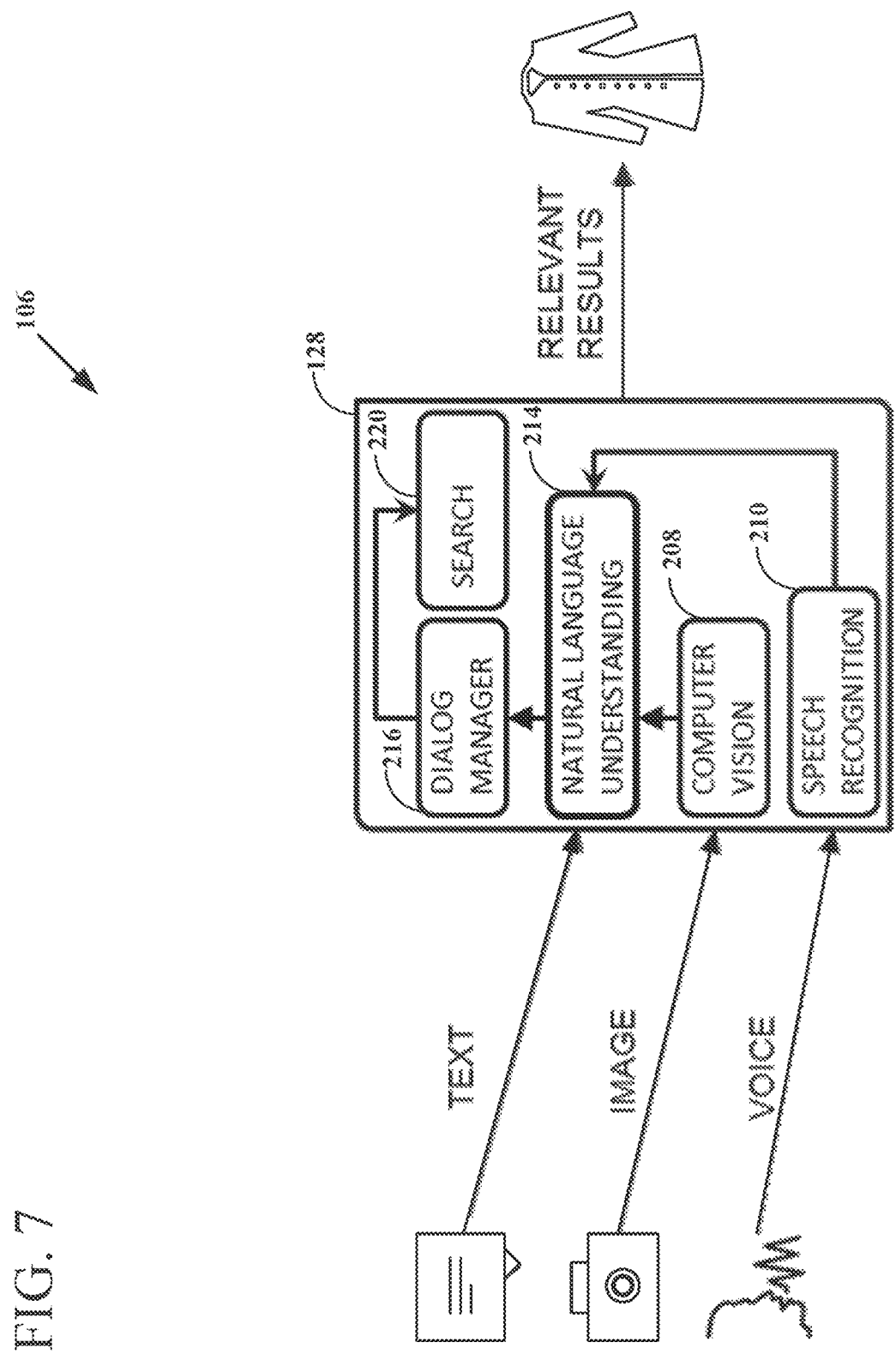
FIG. 7 shows an overview of the intelligent personal assistant system processing natural language user inputs to generate an item recommendation in an electronic marketplace, according to some example embodiments.

FIG. 7 shows an overview of the intelligent personal assistant system 106 processing natural language user inputs to generate an item recommendation in an electronic marketplace. Although the intelligent personal assistant system 106 is not limited to this use scenario, it may be of particular utility in this situation. As previously described, any combination of text, image, and voice data may be received by the artificial intelligence framework 128. Image data may be processed by the computer vision component 208 to provide image attribute data. Voice data may be processed by the speech recognition component 210 into text.

All of these inputs and others may be provided to the NLU component 214 for analysis. The NLU component 214 may operate to parse user inputs and help determine the user intent and intent-related parameters. For example, the NLU component 214 may discern the dominant object of user interest, and a variety of attributes and attribute values related to that dominant object. The NLU component 214 may also determine other parameters such as the user input type (e.g., a question or a statement) and targeted item recipients. The NLU component 214 may provide extracted data to the dialog manager 216, as well as the AI orchestrator 206 previously shown.

The NLU component 214 may generally transform formal and informal natural language user inputs into a more formal, machine-readable, structured representation of a user's query. That formalized query may be enhanced further by the dialog manager 216. In one scenario, the NLU component 214 processes a sequence of user inputs including an original query and further data provided by a user in response to machine-generated prompts from the dialog manager 216 in a multi-turn interactive dialog. This user-machine interaction may improve the efficiency and accuracy of one or more automated searches for the most relevant items available for purchase in an electronic marketplace. The searches may be performed by the search component 220.

Extracting user intent is very helpful for the AI bot in determining what further action is needed. In one ecommerce-related example, at the very highest level, user intent could be shopping, chit-chat, jokes, weather, etc. If the user intent is shopping, it could relate to the pursuit of a specific shopping mission, gifting an item for a target recipient other than the user, or just to browse an inventory of items available for purchase. Once the high level intent is identified, the artificial intelligence framework 128 is tasked with determining what the user is looking for; that is, is the need broad (e.g., shoes, dresses) or more specific (e.g., two pairs of new black Nike™ size 10 sneakers) or somewhere in between (e.g., black sneakers)?

In a novel and distinct improvement over the prior art in this field, the artificial intelligence framework 128 may map the user request to certain primary dimensions, such as categories, attributes, and attribute values, that best characterize the available items desired. This gives the bot the ability to engage with the user to further refine the search constraints if necessary. For example, if a user asks the bot for information relating to dresses, the top attributes that need specification might be color, material, and style. Further, over time, machine learning may add deeper semantics and wider "world knowledge" to the system, to better understand the user intent. For example, the input "I am looking for a dress for a wedding in June in Italy" means the dress should be appropriate for particular weather conditions at a given time and place and should be appropriate for a formal occasion. Another example might include a user asking the bot for "gifts for my nephew". The artificial intelligence framework 128 when trained will understand that gifting is a special type of intent, that the target recipient is male based on the meaning of "nephew", and that attributes such as age, occasion, and hobbies/likes of the target recipient should be clarified.

Figure 8:
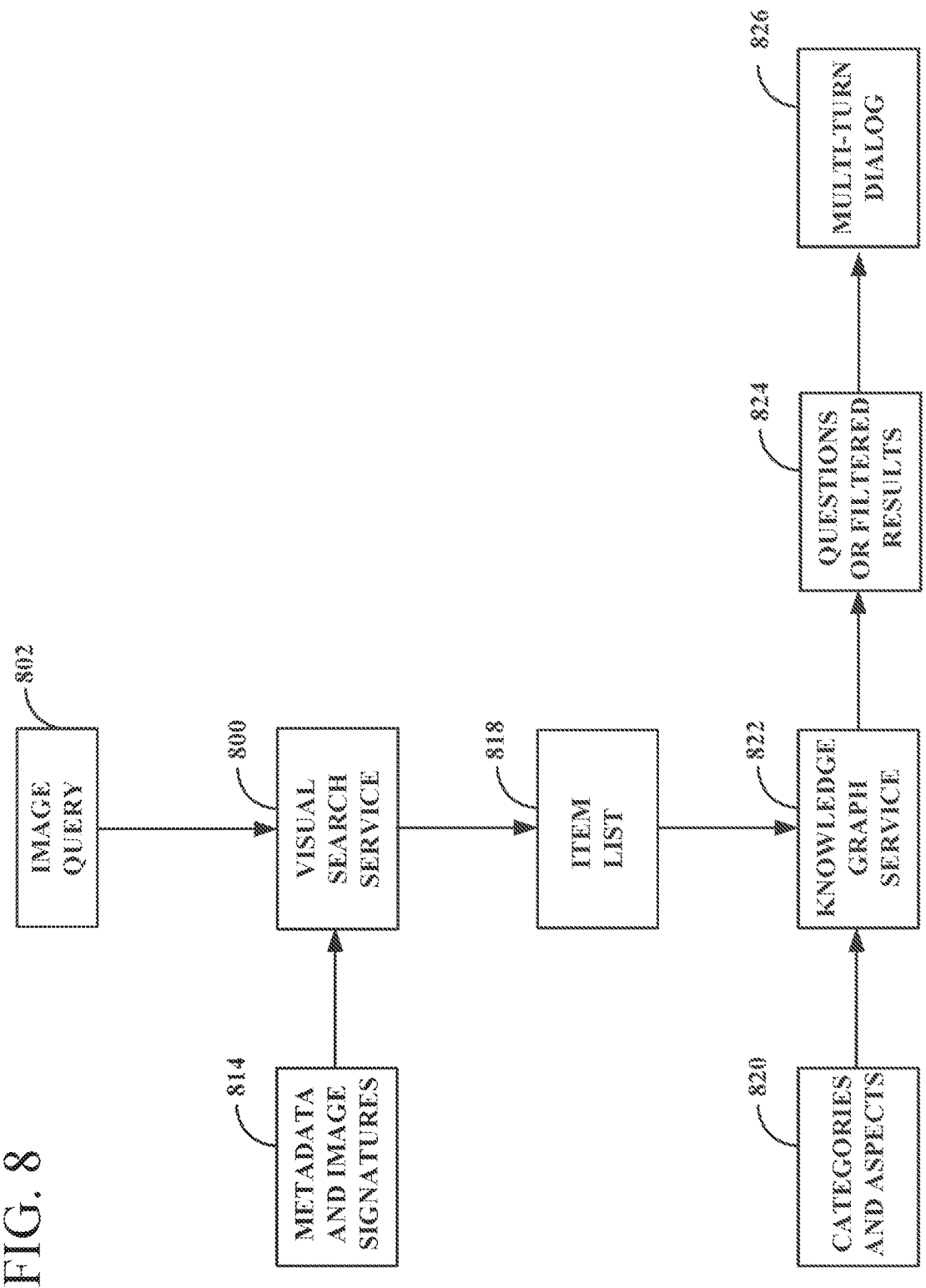
FIG. 8 shows a visual search service that interacts with a knowledge graph service, according to some example embodiments.

FIG. 8 shows a visual search service 800 that interacts with a knowledge graph service 822, according to some example embodiments. The present inventors have recognized, among other things, that product searches in an electronic marketplace may be improved by combining a visual search with a knowledge graph based search. An electronic marketplace that processes millions of products per week may collect a vast amount of data about its inventory, which may be represented by knowledge graph entries.

However, existing text-based search tools may not always capitalize on that data as effectively as tools that perform visual searches or combine visual searches and knowledge graph based searches. This description therefore provides a method for processing natural language input so a user can easily take advantage of both knowledge graph information (via a multi-turn dialog for example), and visual query information so that a user can easily take advantage of product image information.

The visual search service 800 may, in one embodiment, comprise software instructions called for execution on at least one hardware-based processor by the AI orchestrator 206 which coordinates information within the artificial intelligence framework 128 as previously described. In one embodiment, the visual search service 800 may be part of the computer vision component 208, but in general the visual search service 800 may coordinate information between any number of components.

The visual search service 800 may receive an image query 802 originating from a user. The image query 802 may comprise one or more images the user believes will be helpful in finding a particular product. For simplicity, but not by limitation, this description may refer to image query 802 as comprising a single input query image. The input query image may comprise a photograph, a video frame, a sketch, or a diagram, for example. The input query image is typically a digital image file such as may be produced by a portable camera or smartphone, or such as may be copied from a web site or an electronic message.

The visual search service 800 may comprise or interact with a number of functional component blocks, which may each comprise a hardware processor implemented software program for example. A neural network (not shown) in the visual search service 800 for example may process the input query image. The neural network may comprise a fully convolutional neural network (FCN) as described in the previously cited article by Long et al. In another embodiment, the neural network may comprise a hybrid neural network (termed a CRF-RNN) including a fully convolutional neural network and a recurrent network (RNN) that includes conditional random fields (CRF) as described in the previously cited article by Zheng et al.

Images processed by the neural network may comprise an input query image from the image query 802 as well as any number of images associated with any number of candidate products in an electronic marketplace, for example. The neural network in the visual search service 800 may produce an image signature that concisely describes image content. In general, an image signature may numerically describe a number of image features and their relative dominance of overall image content. Each image signature may comprise a vector of binary numbers for example, also referred to as a binary hash. Any form of image signature may be considered to be within the scope of this description.

The visual search service 800 may generate metadata and image signatures from input query images. The visual search service 800 may also receive metadata and image signatures from product images, shown in block 814. Metadata may comprise for example a product identification (ID) number and a universal resource locator (URL) for a product listing in the electronic marketplace.

The visual search service 800 may then calculate a visual similarity measure between images, such as between a particular candidate product image and the input query image. The visual similarity measure may be estimated by calculating a distance value between two image signatures. The distance may comprise a Hamming distance, by way of example but not limitation. A Hamming distance generally describes the number of bits that are different in two binary vectors. Similar images being compared may therefore have a smaller Hamming distance between them, and thus a higher visual similarity measure. The visual similarity measure is therefore useful as a search result score, e.g., for the candidate product at hand.

In one embodiment, the external data in block 814 is computed offline for some or all of the products or items available in an electronic marketplace and is stored in a database. For a marketplace with a large number of products available, substantially real time computation of image signatures may not be computationally feasible. The visual search service 800 may not only be used to help a shopper find a relevant product in the electronic marketplace but may be used for other external visual search tasks assigned by external tools.

In one embodiment, each product image previously provided by sellers in an electronic marketplace may be processed to generate an image signature that may be stored in the index 814. The processing may be performed offline to build a catalog of image signatures without interfering with ongoing "live" operations of the electronic marketplace.

Any approach for calculating the visual similarity measure may provide the search result score described. Visual search result scores for any number of candidate products may for example be generated via visual comparisons with an input query image as described above. The visual search result scores may determine the order in which ranked candidate products may be presented to a user in response to the image query 802. The end result of the visual search methodology described may comprise an output item list 818 that may correspond to available products in the electronic marketplace, for example.

Figure 11:
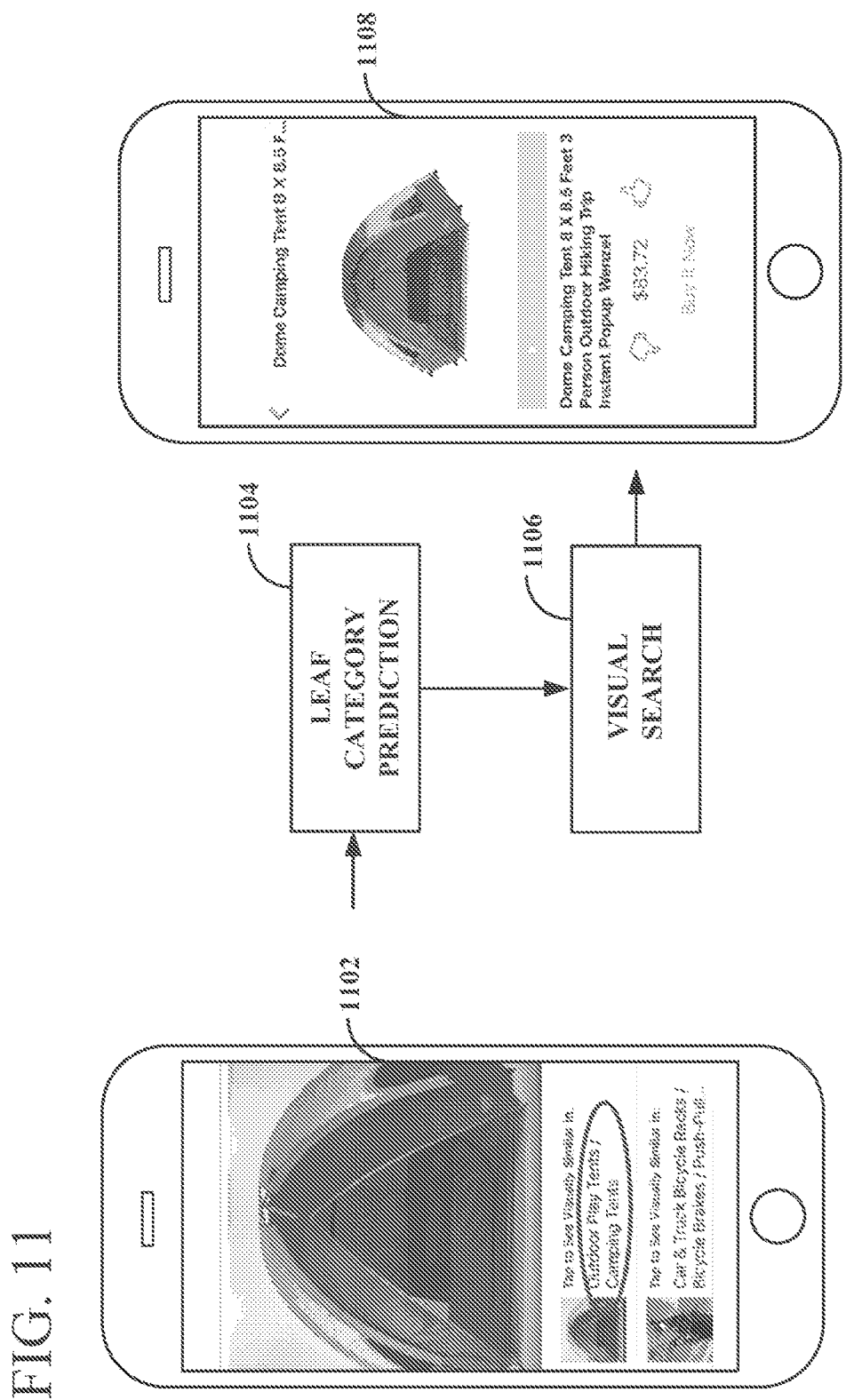
FIG. 11 shows a visual product search that generates product suggestions in response to user category input, according to some example embodiments.

The results of a visual search may be factored into an overall composite search scheme in any number of different formulations. In one example, a weighting coefficient may weight the visual search result score by a user-adjustable weighting factor, and the remaining weight may be applied to scores from a leaf category prediction from the knowledge graph. FIG. 11 describes this type of composite weighting in more detail.

The knowledge graph may have categories, aspects, and aspect values provided by sellers to help buyers find the product in the electronic marketplace inventory. Similarly, the knowledge graph may include popular categories, aspects, and aspect values that buyers have frequently used when searching for particular items. Categories may describe predetermined product groupings or sub-groupings provided by the electronic marketplace (e.g., "wine", "shoes", "paint"), or may be open-ended for seller definition. Categories may be branched, so that a particularly narrow sub-category may be regarded as a leaf category (e.g., "men's athletic shoes") that may best narrow a given search to a small set of items best meeting a specified set of search constraints.

Aspects (also called attributes) may comprise descriptive parameters that may be specified by particular values, to provide further precise search keys for finding a particular product. Exemplary aspects or attributes may include but are not limited to "brand", "color", "style", "material", "size". Corresponding exemplary values may include "Nike", "red", "running", "canvas", "ten", for example. Knowledge graph construction and use is described further in the related applications previously incorporated by reference.

Some aspect values may be readily discernible via a visual search, while others may not. The combination of a visual search and a knowledge graph search may therefore enhance product searching significantly. Broadly speaking, each type of search will find some results, but the combination finds the intersection of the results. The final output is often astonishingly accurate and unexpectedly fast.

Figure 9:
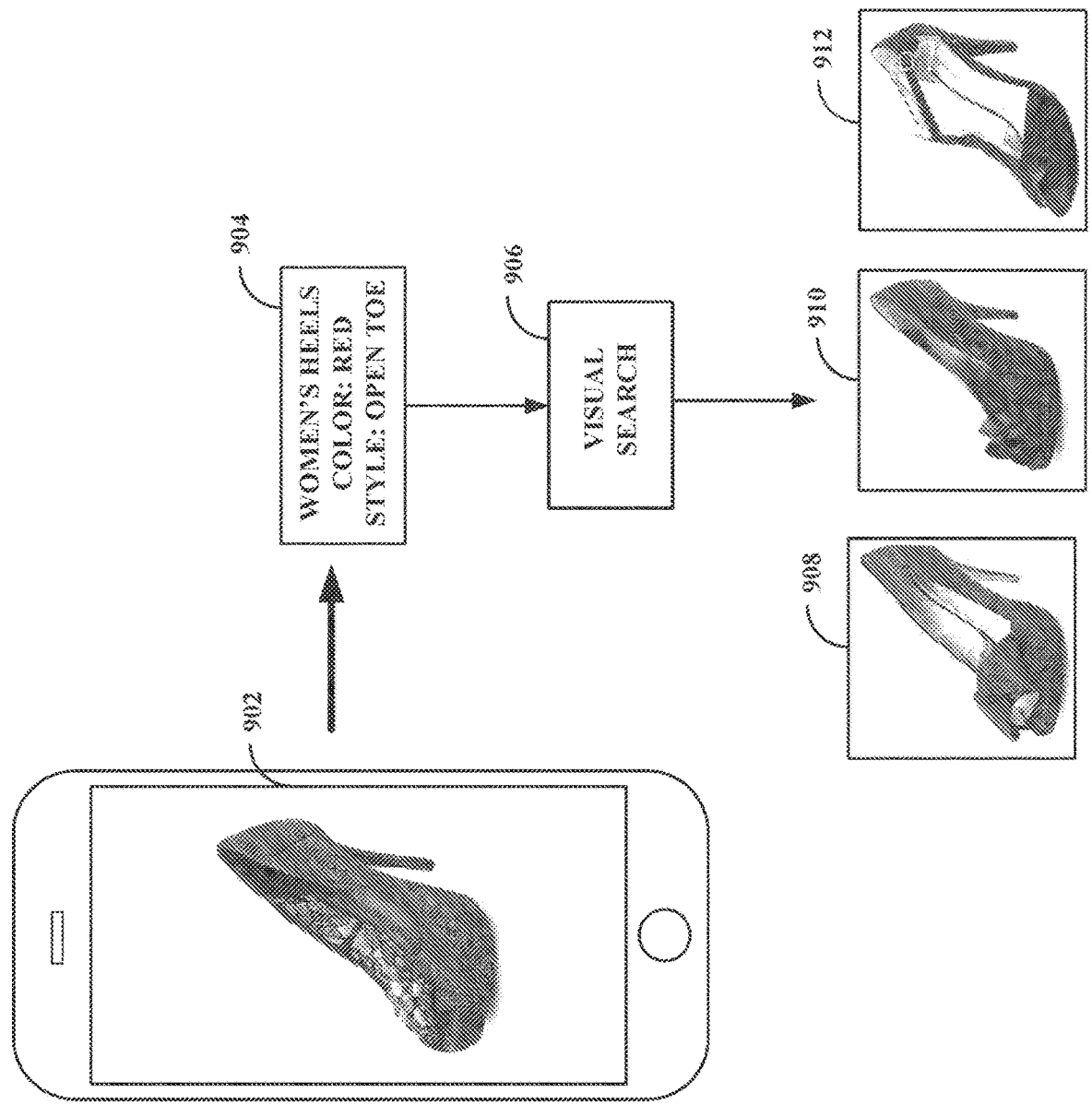
FIG. 9 shows a visual product search that generates product suggestions, according to some example embodiments.

FIG. 9 shows a visual product search that generates product suggestions, according to some example embodiments. The user provides input query image 902 of a shoe. The image signature 814 generated from the input query image 902 may in itself denote that a particular category ("women's heels") and aspects and aspect value tuples ("color:red", and "style:open toe") are strongly indicated. The visual search may therefore be narrowed to those candidate products that share those category, aspect, and aspect values, rather than including all available candidate products. That is, a visual search alone may resolve categories, aspects, and aspect values just as a non-visual search may, depending on the inputs provided.

If the item list 818 includes several strong "hits", based on the visual similarity measures obtained, the knowledge graph service 822 may merely confirm that the category, aspects, and aspect values are also strongly linked to the candidate products. The "bot" may thus elect to perform little or no further filtering of the candidate products in the item list. The "bot" may also elect to output several of the most strongly matching candidate products rather than generating a statement type or question type user prompt.

The number of candidate products displayed (three in this case, 908, 910, and 912) may thus generally be based on the amount of result filtering performed at block 824. That is, if the knowledge graph service 822 finds a strong indication that little re-ranking or filtering is required to reconcile the two types of searches, it may elect to output only a small number of the best matching candidate products. If the indication is sufficiently strong, as will be shown in FIG. 11, only a single matching candidate product may need to be displayed.

In general, searching and prompting may iterate until a stopping condition occurs. A user may provide input that clearly indicates an intent change for example. A user may also submit an entirely new query to try a different approach to achieving the same or similar search intent; this is often the result of user frustration. And, of course, a user may be sufficiently pleased with the search results to make a final selection of a candidate product (or products) that have been systematically gathered during the multi-turn dialog.

Figure 10:
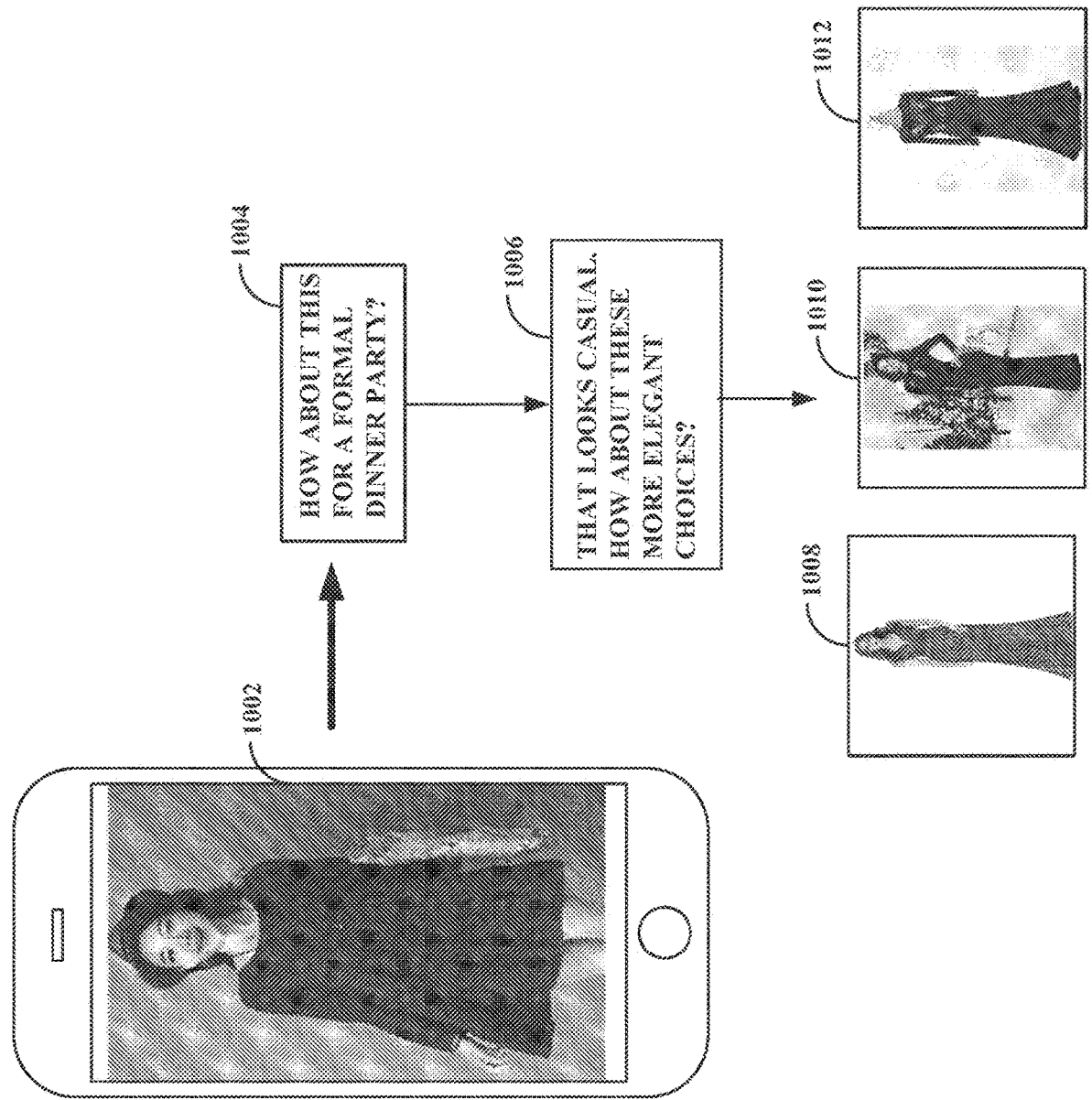
FIG. 10 shows a visual product search that generates product suggestions in response to user non-image input, according to some example embodiments.

FIG. 10 shows a visual product search that generates product suggestions in response to user non-image input, according to some example embodiments. The visual search service 800 performs a visual search based on the image signature it generates for input query image 1002 of a dress, in comparison with image signatures of candidate product images in database 814. The result is an internal ranked list of potentially matching items 818, as previously described.

However, unlike the previous example, the "bot" acts to provide expertise via a statement prompt, a question prompt, and a candidate product image suggestion prompt via a dialog turn first. Why? In this example, a user also provides a natural language utterance (e.g., text or voice converted to text) input question.

The parsed input question "How about this for a formal dinner party?" contains the term "formal" that may be recognized as an aspect value 820 that also appears in the knowledge graph, perhaps for the aspect "style". The term "dinner party" may also be recognized, perhaps as an aspect value for the aspect "occasion" in the knowledge graph. The "bot" therefore identifies the user's intent from its processing of the natural language utterance. It further recognizes that the visual search results do not strongly correlate with candidate product images for "formal" and "dinner party" dresses. This mismatch would lead to a great deal of filtering, perhaps such that no acceptable candidate products may be found.

The knowledge graph service 822 therefore elects to generate both a statement type user prompt and a question type user prompt at 824 to solicit further user input. The statement type user prompt "That looks casual." therefore denotes the conflicting results between the visual search and the knowledge graph search. The statement explains the recognition of the contradiction in the results of different search types to the user.

The question type prompt asks the user to consider "more elegant" choices. This behavior is probably because the term "elegant" is associated in the knowledge graph historical data with prior buyer searches and/or seller listings for "formal" and "dinner party" dresses. The knowledge graph may contain sufficiently strong attribute values that link "formal" and "dinner party" to particular candidate products. That is, because many sellers historically described these particular candidate products using the terms "formal" or "dinner party", they may be recognized as strong candidates. Similarly, if many buyers historically used "formal" or "dinner party" frequently to find these particular candidate products, that also may strengthen the linkage between the user utterance terms and the user input query image.

The "bot" therefore elects to provide product suggestion type user prompts to determine the user's true intent, perhaps in spite of some user misunderstanding. Candidate products 1008, 1010, and 1012 are displayed for the user because there is sufficient confidence that the user will proceed to make a final product selection, rather than providing further utterances. This example therefore indicates that the intelligent online personal assistant can provide helpful expert guidance via a variety of output types, when necessary. That is, the user prompts may comprise selectable candidate product images for the highest ranked candidate products, or questions requesting further natural input data describing unresolved aspect values.

FIG. 11 shows a visual product search that generates product suggestions in response to user category input, according to some example embodiments. In this example, a user provides an input query image 1102 of a tent, along with circled suggested categories ("Outdoor Play Tents" and "Camping Tents"). The knowledge graph provides a leaf category prediction in block 1104, based on historical data, e.g., denoting that past sellers and buyers in aggregate have frequently used the sub-category of "Dome Camping Tent" to find items characterized by the suggested categories.

The visual search service 800 may perform a visual search based on the image signature it generates for input query image 1102, in comparison with image signatures of candidate product images in database 814. The result is an internal ranked list of potentially matching items 818, as previously described.

However, the knowledge graph service 822 and the visual search service 800 interaction may have led in this case to a suggested product other than either service may have selected separately. Thus, the filtered result in this case is a candidate product that bears both the leaf category predicted and has a candidate product image that very closely matches the provided input query image 1102. The "bot" therefore has such confidence (e.g., weighted support) that the filtered result satisfies the user's search interest that the dialog manager 216 elects to output a single product suggestion rather than engage in further dialog turns with the user.

Figure 12:
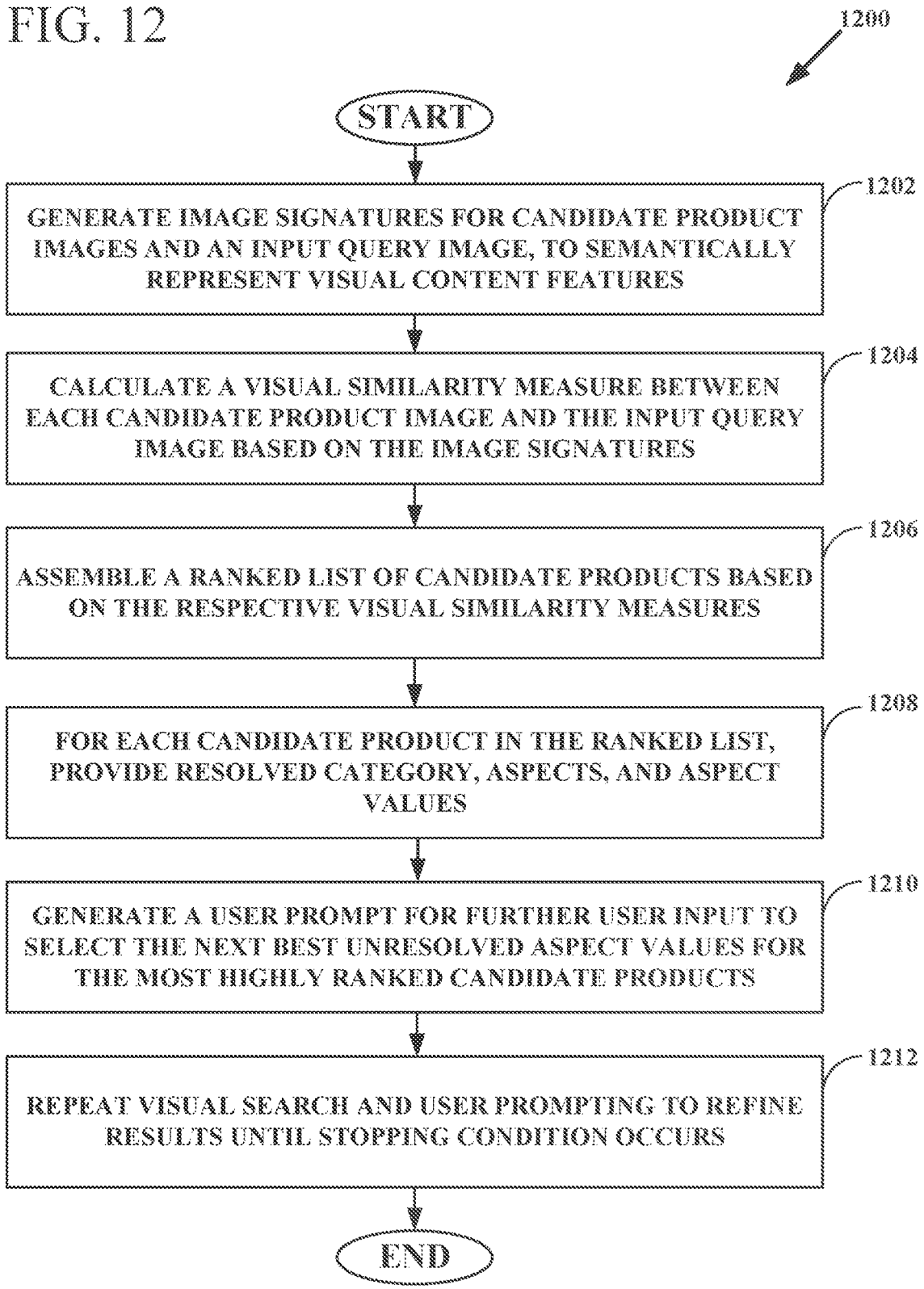
FIG. 12 shows a flowchart of a methodology for visual search service and knowledge graph service interaction, according to some example embodiments.

FIG. 12 shows a flowchart of a methodology 1200 for visual search service and knowledge graph service interaction, according to some example embodiments. The methodology may process natural language input and an image query to generate an item recommendation in an electronic marketplace. This methodology may be implemented via the structural elements previously described, as well as via instructions executed by a processor in a computing machine.

At 1202, the methodology may generate an image signature for each of a plurality of candidate product images and an input query image, where the respective image signatures semantically represent respective visual content features. The image signature generation may be performed by a neural network. At 1204, the methodology may calculate a visual similarity measure between each candidate product image and the input query image based on the corresponding image signatures.

At 1206, the methodology may assemble a ranked list of candidate products based on the respective visual similarity measures. That is, the visual similarity measure may serve as a search result score, and candidate products that are the most highly scored may be presented first. The candidate products may have various resolved categories, aspects, and aspect values associated with them, whether determined from a visual search process or a non-visual search process.

At 1208, for each candidate product in the ranked list, the methodology may provide its corresponding resolved category, aspects, and aspect values to a knowledge graph. The knowledge graph may contain aggregate historical electronic marketplace user interaction information, such as which categories, aspects, and/or aspect values are associated with a given item. These categories, aspects, and/or aspect values may help relate an input query image to a product of interest to the user even if they are not discernible via visual search.

At 1210, the methodology may generate and output a user prompt that requests further user input in a multi-turn dialog. The user prompt may solicit information used for selecting the next most useful unresolved aspect values in the knowledge graph, for the most highly ranked candidate products. By combining visual search information and a knowledge graph based information, embodiments may iteratively filter the list of candidate products to refine the user query.

At 1212, the methodology may repeat the previously described visual search and user prompt operations to refine the ranked list of candidate products to better meet the user's interests. This methodology thus effectively transforms both the input query image and natural language user prompt information, in combination, into a list of the most relevant products.

Figure 13:
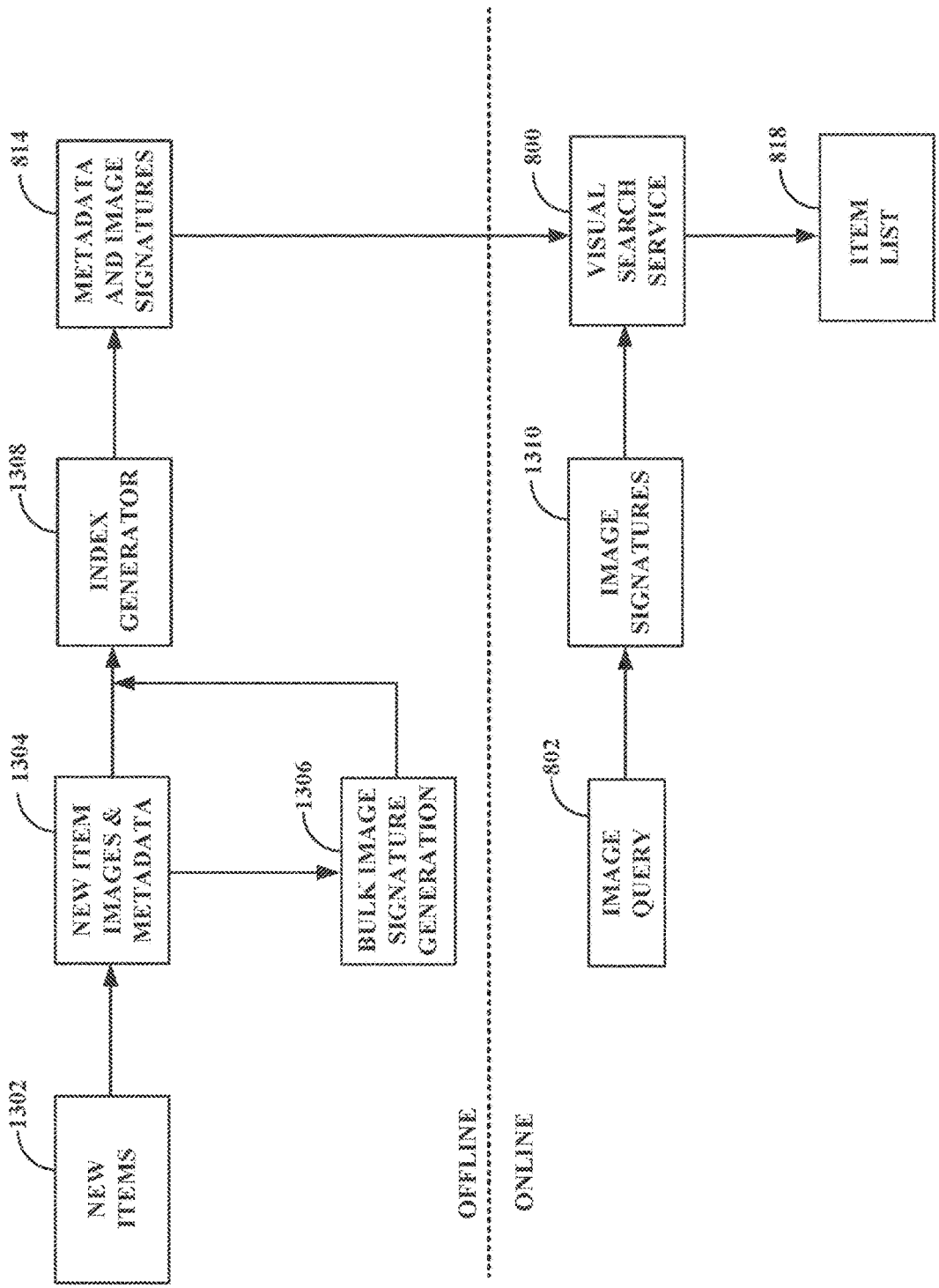
FIG. 13 shows an offline index generation service that interacts with an on-demand visual search service, according to some example embodiments.

FIG. 13 shows an offline index generation service 1306 that interacts with an on-demand visual search service 800, according to some example embodiments. The present inventors have recognized, among other things, that offline processing of an immense product inventory may help produce data needed for a subsequent online search request. New products/items 1302 may be provided to an electronic marketplace, as items to be sold for example. Millions of such items may be provided per week for some electronic marketplaces.

Therefore, the images provided for the new items 1302 may be assembled with item metadata at block 1308. Item metadata may include for example a product identification (ID) number and a universal resource locator (URL) assigned to an item listing page on the electronic marketplace's web site. Each product, which may be a candidate product of interest to a user at some point, may be processed to create descriptive image signatures for one, several, or all of the images provided for it by a seller, for example. Each image signature may comprise a binary hash of a number of floating point numbers that describe various aspects of image content. Thus, each image signature is not merely a compressed version of a product image, but instead comprise a concise semantic summarization of its predominant content features.

A bulk image signature generation block is shown as item 1306. This block may comprise neural network software operating on a server farm to process a vast number of input images in parallel to rapidly produce an image signature for each. Block 1306 may process new item images on a periodic or more continuous ongoing basis. For a large electronic marketplace, a daily batch execution may process all of the images provided for all newly listed products, for example.

The product images, image signatures, and metadata may be combined and formatted by index generator 1308. The descriptive information for the new "live" products may then be put into an inventory database 814 that may for example contain the entire inventory for the electronic marketplace. The inventory database 814 may be centralized, or it may be replicated to multiple processing sites in a distributed computer network. Local availability of a copy of the inventory database 814 may help a local user view product listings on the electronic marketplace with less network latency, for example.

An online user who is interested in finding a particular product may then submit an image query 802, to be processed on demand. Image query 802 may comprise a number of input query images. Block 1310 may generate image signatures on demand for the input query images, for example following the same image signature format used by the electronic marketplace for the new product listing images.

The visual search service 800 may then calculate, on demand, a visual similarity measure between each candidate product image and the input query image based on the respective corresponding image signatures. The visual search service 800 may comprise neural network software executing on a number of hardware processors, for example. The visual search service 800 does not need to compute image signatures for the products available for sale because those have already been generated and stored in the database 814. The combined offline product image processing and the online query image processing may therefore perform a visual query for a user without significant user-discernible delay. This approach to product searching may therefore improve the efficiency of user product searching, and thus effectively improve the operation of the electronic marketplace computer system as a whole.

Figure 14:
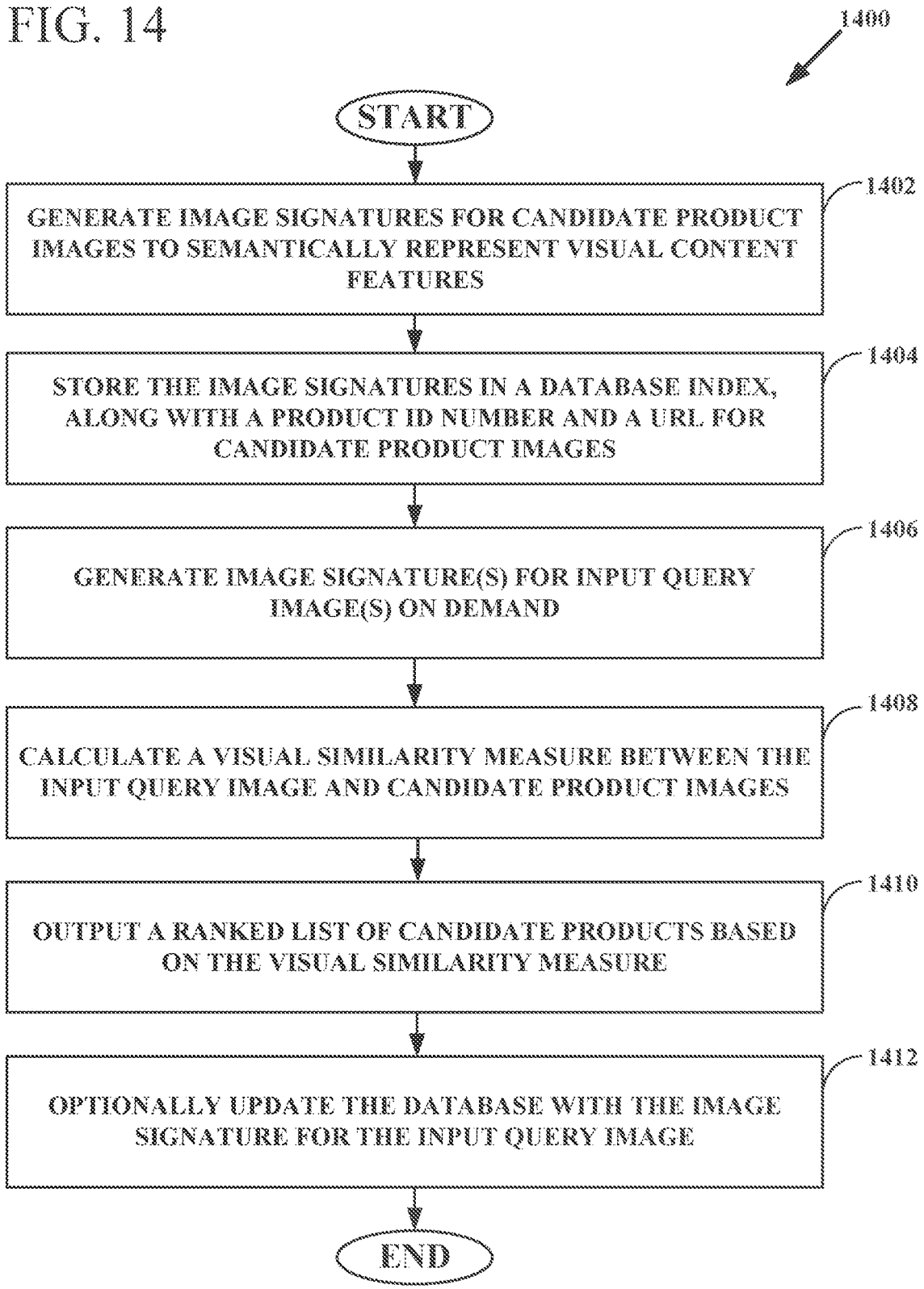
FIG. 14 shows a flowchart of a methodology for offline index generation for visual search, according to some example embodiments.

FIG. 14 shows a flowchart of a methodology 1400 for offline index generation for visual search, according to some example embodiments. The methodology may identify a candidate product in an electronic marketplace based on an on-demand visual comparison between candidate product image visual content and visual content of an image query. This methodology may be implemented via the structural elements previously described, as well as via instructions executed by a processor in a computing machine.

At 1402, the methodology may generate an image signature for each candidate product image (or a selected subset), where the respective image signatures semantically represent the candidate product image visual content features. The image signature generation may be performed by a neural network. At 1404, the methodology may store, in a database, the image signature along with a product identification (ID) number and a universal resource locator (URL) associated with each candidate product image. The generating and storing may be performed for new products currently listed in the electronic marketplace on a periodic basis or a more continuous ongoing basis.

Since an electronic marketplace may have millions of products/items listed at any given time, the generating and storing may be performed by a plurality of processors (e.g., in a server farm) operating in parallel. Each candidate product may have multiple candidate product images associated with it, and each such image may be similarly processed. The database may be replicated at multiple processing sites in a distributed computer network, to for example provide faster access to users in a given geographic region.

At 1406, the methodology may generate a further image signature for an input query image. This input query image signature may be generated by a neural network and may be generated "online" or on demand, with little or no user-discernible delay. At 1408, the methodology may calculate a visual similarity measure between each candidate product image and the input query image. Although described as processing each candidate product image here, the methodology may incorporate other operations that very effectively reduce the product search space so that a more relevant subset of the candidate product images may be compared to the input query image via the respective image signatures.

At 1410, the methodology may output a ranked list of candidate products based on the visual similarity measure. That is, the visual similarity measure may serve as a search result score, and candidate products that are the most highly scored may be presented first. At 1412, the methodology may update the database with the image signature for the input query image, even if the input query image is not of an item being placed for sale on the electronic marketplace. Thus, although the database may encompass information regarding some or all of the items available for sale on the electronic marketplace, this feature is exemplary and not limiting. This methodology thus effectively transforms the input query image into a list of the most relevant products.

The specific ordered combinations described herein may improve the overall operation of a computer system used to help a user find products of interest in an electronic marketplace. The input images (e.g., candidate product images and query images) are effectively transformed into a ranked list of products that may most satisfy a user's shopping interests. The overall speed of searching is improved to reduce the time that a user has to spend while still searching a given (typically large) number of candidate products, compared with purely text-based search approaches of the past. The number of search iterations may also be reduced via the specialized approaches described, so that overall efficiency of user interaction with an electronic marketplace is measurably increased.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
   receiving, via a graphical user interface, an input query image;
   processing, by a neural network, the input query image to generate a list of candidate products based on knowledge graph data and a visual similarity measure indicating respective correlations between a plurality of candidate product images and the input query image, the knowledge graph data used to confirm the respective correlations between the plurality of candidate product images and the input query image; and
   outputting, for display at the graphical user interface, at least one candidate product from the list of candidate products.

2. The method of claim 1, further comprising:
   outputting, for display at the graphical user interface, a prompt requesting user input corresponding to the input query image based on determining that the respective correlations between the plurality of candidate product images and the input query image satisfy a threshold value; and
   receiving, via the graphical user interface and in response to the prompt, the user input, wherein outputting the at least one candidate product is based on processing the user input using the neural network.

3. The method of claim 1, further comprising selecting the at least one candidate product from the list of candidate products based on filtering the plurality of candidate product images, wherein the at least one candidate product is output for display based on a numerical quantity of candidate product images obtained by the filtering satisfying a threshold value.

4. The method of claim 3, further comprising iteratively filtering the plurality of candidate product images until the numerical quantity of candidate product images obtained by the filtering satisfies the threshold value.

5. The method of claim 1, further comprising confirming the respective correlations between the plurality of candidate product images and the input query image based on a comparison of one or more values of the knowledge graph data to the visual similarity measure.

6. The method of claim 1, wherein the processing the input query image further comprises:
   generating, as an output from the neural network, a first image signature for the input query image; and
   retrieving, from a database, respective second image signatures for the plurality of candidate product images, wherein the visual similarity measure is based on a comparison between the first image signature and the respective second image signatures.

7. The method of claim 6, wherein:
   the first image signature includes a numerical representation of the input query image; and
   the respective second image signatures include respective numerical representations of the plurality of candidate product images.

8. The method of claim 6, further comprising storing, at the database, the first image signature for the input query image.

9. The method of claim 1, wherein the knowledge graph data includes one or more values corresponding to at least one of one or more products in the list of candidate products or one or more product searches.

10. The method of claim 1, wherein a numerical quantity of candidate products of the at least one candidate product corresponds to the respective correlations between the plurality of candidate product images and the input query image.

11. A system, comprising:
   at least one processor; and
   at least one memory including instructions that, upon execution by the at least one processor, cause the system to perform operations comprising:
      receiving, via a graphical user interface, an input query image;
      processing, by a neural network, the input query image to generate a list of candidate products based on knowledge graph data and a visual similarity measure indicating respective correlations between a plurality of candidate product images and the input query image, the knowledge graph data used to confirm the respective correlations between the plurality of candidate product images and the input query image; and
      outputting, for display at the graphical user interface, at least one candidate product from the list of candidate products.

12. The system of claim 11, the operations further comprising:
   outputting, for display at the graphical user interface, a prompt requesting user input corresponding to the input query image based on determining that the respective correlations between the plurality of candidate product images and the input query image satisfy a threshold value; and
   receiving, via the graphical user interface and in response to the prompt, the user input, wherein outputting the at least one candidate product is based on processing the user input using the neural network.

13. The system of claim 11, the operations further comprising selecting the at least one candidate product from the list of candidate products based on filtering the plurality of candidate product images, wherein the at least one candidate product is output for display based on a numerical quantity of candidate product images obtained by the filtering satisfying a threshold value.

14. The system of claim 11, the operations further comprising confirming the respective correlations between the plurality of candidate product images and the input query image based on a comparison of one or more values of the knowledge graph data to the visual similarity measure.

15. The system of claim 11, wherein the operations to process the input query image further comprise:
   generating, as an output from the neural network, a first image signature for the input query image; and
   retrieving, from a database, respective second image signatures for the plurality of candidate product images, wherein the visual similarity measure is based on a comparison between the first image signature and the respective second image signatures.

16. The system of claim 11, wherein the knowledge graph data includes one or more values corresponding to at least one of one or more products in the list of candidate products or one or more product searches.

17. The system of claim 11, wherein a numerical quantity of candidate products of the at least one candidate product corresponds to the respective correlations between the plurality of candidate product images and the input query image.

18. One or more non-transitory computer-readable medium storing instructions executable by at least one processor to cause the at least one processor to perform operations comprising:
   receiving, via a graphical user interface, an input query image;
   processing, by a neural network, the input query image to generate a list of candidate products based on knowledge graph data and a visual similarity measure indicating respective correlations between a plurality of candidate product images and the input query image, the knowledge graph data used to confirm the respective correlations between the plurality of candidate product images and the input query image; and
   outputting, for display at the graphical user interface, at least one candidate product from the list of candidate products.

19. The one or more non-transitory computer-readable medium of claim 18, the operations further comprising:
   outputting, for display at the graphical user interface, a prompt requesting user input corresponding to the input query image based on determining that the respective correlations between the plurality of candidate product images and the input query image satisfy a threshold value; and
   receiving, via the graphical user interface and in response to the prompt, the user input, wherein outputting the at least one candidate product is based on processing the user input using the neural network.

20. The one or more non-transitory computer-readable medium of claim 18, the operations further comprising selecting the at least one candidate product from the list of candidate products based on filtering the plurality of candidate product images, wherein the at least one candidate product is output for display based on a numerical quantity of candidate product images obtained by the filtering satisfying a threshold value.

* * * * *